(12) United States Patent
Zhang et al.

(10) Patent No.: US 11,082,155 B2
(45) Date of Patent: Aug. 3, 2021

(54) PHYSICAL LAYER (PHY) DATA UNIT FORMAT FOR HYBRID AUTOMATIC REPEAT REQUEST (HARQ)

(71) Applicant: NXP USA, Inc., Austin, TX (US)

(72) Inventors: Yan Zhang, Palo Alto, CA (US); Liwen Chu, San Ramon, CA (US); Rui Cao, Fremont, CA (US); Sudhir Srinivasa, Los Gatos, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/667,521

(22) Filed: Oct. 29, 2019

(65) Prior Publication Data

US 2020/0136764 A1     Apr. 30, 2020

Related U.S. Application Data

(60) Provisional application No. 62/841,007, filed on Apr. 30, 2019, provisional application No. 62/752,884, filed on Oct. 30, 2018.

(51) Int. Cl.
| | |
|---|---|
| *H04W 4/00* | (2018.01) |
| *H04L 1/00* | (2006.01) |
| *H04L 1/18* | (2006.01) |
| *H04W 72/00* | (2009.01) |
| *H04L 5/00* | (2006.01) |

(Continued)

(52) U.S. Cl.
CPC .......... *H04L 1/0043* (2013.01); *H04L 1/0057* (2013.01); *H04L 1/0063* (2013.01); *H04L 1/1812* (2013.01); *H04L 1/1893* (2013.01);

*H04L 1/1896* (2013.01); *H04L 5/0007* (2013.01); *H04L 5/0044* (2013.01);

(Continued)

(58) Field of Classification Search
None
See application file for complete search history.

(56) References Cited

U.S. PATENT DOCUMENTS

| | | |
|---|---|---|
| 6,718,497 B1 | 4/2004 | Whitby-Strevens |
| 7,054,296 B1 | 5/2006 | Sorrells et al. |

(Continued)

FOREIGN PATENT DOCUMENTS

WO    WO-2009/120460 A2    10/2009

OTHER PUBLICATIONS

U.S. Appl. No. 16/667,534, Zhang et al., "Method and Apparatus for Generating a Physical Layer (PHY) Data Unit for Hybrid Automatic Repeat Request (HARQ)," filed Oct. 29, 2019.

(Continued)

*Primary Examiner* — Elisabeth Benoit Magloire

(57) ABSTRACT

A communication device generates one or more physical layer (PHY) PHY protocol service data units (PSDUs) of a PHY data unit, and individually encodes PSDUs of the one or more PSDUs. The communication device generates a PHY preamble of the PHY data unit, including: generating a first signal field in the PHY preamble, and including in the first signal field an indicator to indicate that the PHY preamble includes a second signal field with HARQ information regarding the PHY data unit, and generating the second signal field to include one or more indications of one or more durations of the one or more respective PSDUs within a PHY data portion of the PHY data unit.

24 Claims, 15 Drawing Sheets

(51) Int. Cl.
*H04W 80/02* (2009.01)
*H04W 84/12* (2009.01)

(52) U.S. Cl.
CPC ......... *H04W 72/005* (2013.01); *H04W 80/02* (2013.01); *H04W 84/12* (2013.01)

(56) References Cited

U.S. PATENT DOCUMENTS

| | | |
|---|---|---|
| 8,175,015 B1 | 5/2012 | Chowdhuri et al. |
| 8,599,803 B1 | 12/2013 | Zhang et al. |
| 9,319,174 B2 | 4/2016 | Merlin et al. |
| 9,351,333 B1 | 5/2016 | Zhang et al. |
| 9,369,240 B2 | 6/2016 | Pirskanen et al. |
| 9,876,614 B1 | 1/2018 | Sun et al. |
| 10,135,582 B1 | 11/2018 | Sun et al. |
| 2005/0180315 A1 | 8/2005 | Chitrapu et al. |
| 2006/0050742 A1 | 3/2006 | Grandhi et al. |
| 2007/0186134 A1 | 8/2007 | Singh et al. |
| 2007/0245205 A1 | 10/2007 | Popovski et al. |
| 2008/0165670 A1 | 7/2008 | Tao et al. |
| 2008/0186890 A1* | 8/2008 | Shao ................. H04W 52/0229 370/311 |
| 2008/0186944 A1* | 8/2008 | Suzuki ................. H04L 1/1685 370/349 |
| 2009/0031185 A1 | 1/2009 | Xhafa et al. |
| 2009/0074088 A1 | 3/2009 | Tao et al. |
| 2009/0219851 A1 | 9/2009 | Abraham et al. |
| 2009/0219870 A1 | 9/2009 | Wengerter et al. |
| 2009/0259915 A1 | 10/2009 | Livshitz et al. |
| 2010/0054189 A1 | 3/2010 | Chang et al. |
| 2011/0038332 A1 | 2/2011 | Liu et al. |
| 2011/0134816 A1 | 6/2011 | Liu et al. |
| 2011/0199971 A1 | 8/2011 | Kim et al. |
| 2011/0305176 A1 | 12/2011 | Wentink |
| 2012/0140753 A1 | 6/2012 | Lee et al. |
| 2013/0114515 A1* | 5/2013 | Koo ..................... H04J 11/0023 370/329 |
| 2013/0229996 A1 | 9/2013 | Wang et al. |
| 2013/0294328 A1* | 11/2013 | Aboul-Magd ........... H04B 7/15 370/315 |
| 2013/0315139 A1 | 11/2013 | Abraham et al. |
| 2014/0079016 A1 | 3/2014 | Dai et al. |
| 2014/0126580 A1 | 5/2014 | Sampath et al. |
| 2014/0185695 A1 | 7/2014 | Kenney et al. |
| 2014/0269605 A1* | 9/2014 | Pecen ................ H04W 74/0858 370/330 |
| 2014/0293868 A1 | 10/2014 | Levanen et al. |
| 2015/0049677 A1 | 2/2015 | Lin et al. |
| 2015/0063233 A1 | 3/2015 | Choi et al. |
| 2016/0227437 A1 | 8/2016 | Blanksby et al. |
| 2016/0380727 A1* | 12/2016 | Ryu .......................... H04L 1/18 370/245 |
| 2017/0012683 A1 | 1/2017 | Bharadwaj et al. |
| 2017/0127298 A1* | 5/2017 | Ryu ...................... H04L 5/0055 |
| 2017/0201357 A1* | 7/2017 | Choi ................... H04L 27/2605 |
| 2017/0201981 A1 | 7/2017 | Huang et al. |
| 2017/0230149 A1* | 8/2017 | Wang ................... H04L 1/1819 |
| 2018/0102929 A1 | 4/2018 | Lin et al. |
| 2018/0139635 A1* | 5/2018 | Oteri ..................... H04W 52/34 |
| 2018/0302256 A1 | 10/2018 | Huang et al. |
| 2020/0344006 A1 | 10/2020 | Shellhammer et al. |
| 2020/0344007 A1 | 10/2020 | Chen et al. |

OTHER PUBLICATIONS

IEEE Std 802.11-REVmcTM/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages. (Aug. 2016).

International Search Report and Written Opinion in International Patent Application No. PCT/US2019/058558, dated Jan. 31, 2020 (12 pages).

IEEE Draft 802.11ax D3.2, "Draft Standard for Information Technology—Telecommunications and information exchange between systems Local and metropolitan area networks—Specific rqeuirements Part 11: Wireless LAN Medium Access Control (MAC) and Physical Layer (PHY) Specifications—Amendment 1: Enhancements for High . . ." vol. 802.11ax drafts, No. D3.2, pp. 1-698 (Oct. 16, 2018).

Non-Final Office Action for U.S. Appl. No. 16/667,534 dated Jan. 1, 2021, 17 pages.

Notice of Allowance for U.S. Appl. No. 16/667,534 dated Apr. 6, 2021, 8 pages.

\* cited by examiner

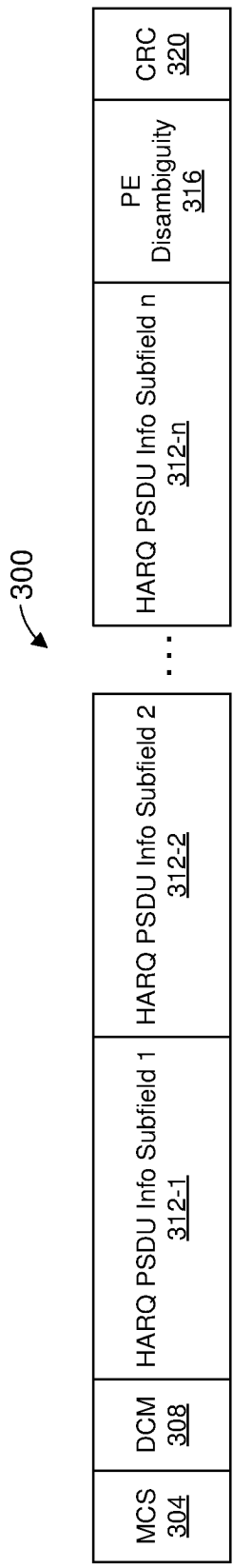
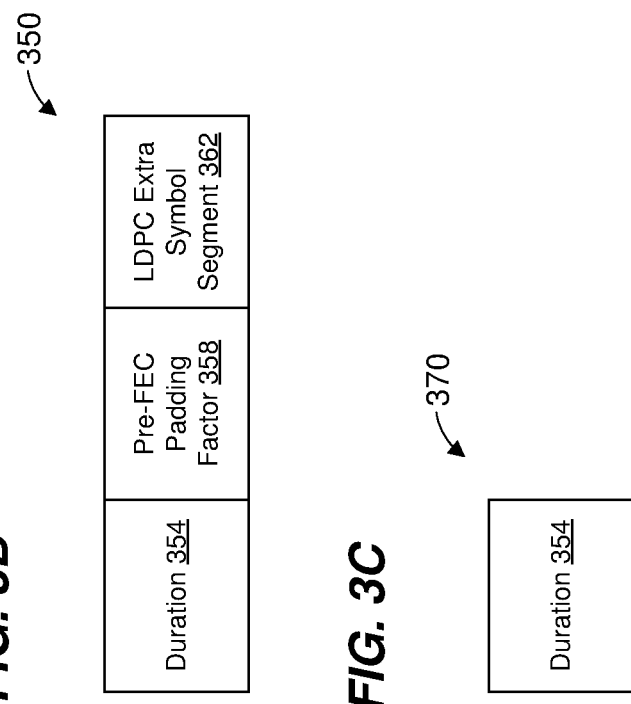

PHYSICAL LAYER (PHY) DATA UNIT FORMAT FOR HYBRID AUTOMATIC REPEAT REQUEST (HARQ)

CROSS REFERENCES TO RELATED APPLICATIONS

This application claims the benefit of U.S. Provisional Patent Application No. 62/752,884, entitled "PHY Frame Format for Efficient Hybrid ARQ (HARQ) Transmissions in WLAN," filed on Oct. 30, 2018, and U.S. Provisional Patent Application No. 62/841,007, entitled "PHY Frame Format for Efficient Hybrid ARQ (HARQ) Transmissions in WLAN," filed on Apr. 30, 2019. Both of the applications referenced above are incorporated herein by reference in their entireties.

Additionally, this application is related to U.S. patent application Ser. No. 16/667,534, entitled "Method and Apparatus for Generating a Physical Layer (PHY) Data Unit for Hybrid ARQ (HARQ)," filed on the same day as the present application, which is incorporated herein by reference in its entirety.

FIELD OF TECHNOLOGY

The present disclosure relates generally to wireless communication systems, and more particularly to physical layer (PHY) data unit formats for hybrid automatic repeat request (HARQ) transmissions.

BACKGROUND

In a wireless local area network (WLAN), communication devices exchange control information in media access control (MAC) protocol data units (MPDUs), sometimes referred to as "frames". Typically, multiple MPDUs are aggregated together and transmitted within one physical layer (PHY) protocol data unit (PPDU). If a receiver is unable to decode an MPDU within the PPDU, a transmitter of the MPDU will retransmit the MPDU within another PPDU.

Hybrid automatic repeat request (HARQ) is a technique for improving throughput in communication systems. With HARQ, when a receiver is not able to decode a received communication frame, the receiver stores the transmission in a buffer. Then, a transmitter retransmits the communication frame and the receiver decodes the communication frame using both the original transmission stored in the buffer and the retransmission, e.g., using "soft combining."

One example of a HARQ technique is referred to as "chase combining." In chase combining, the transmitter retransmits the same identical communication frame one or more times, and the receiver "soft combines" the original transmission and the one or more retransmissions to decode the communication frame.

Another example of a HARQ technique is referred to as "incremental redundancy." In incremental redundancy, the original transmission omits some bits (e.g., "puncturing" is used) from an encoded frame, and each retransmission omits different bits and includes some bits that were not included in the previous transmissions. Thus, with each retransmission, the receiver incrementally receives additional information that was not previously transmitted. The receiver then "soft combines" the original transmission and the one or more retransmissions to decode the communication frame.

PPDU formats defined by current WLAN protocols make the use of HARQ impractical. For example, current WLAN protocols specify that when multiple MPDUs are aggregated together and transmitted within one PPDU, the multiple MPDUs are jointly encoded. Thus, even if only one MPDU in the PPDU was not correctly received, all of the MPDUs in the PPDU would need to be retransmitted to implement HARQ in this context. In contrast, not performing HARQ and simply re-encoding the one MPDU and retransmitting the one MPDU is significantly more efficient.

SUMMARY

In an embodiment, a method for generating a physical layer (PHY) data unit for transmission in a wireless local area network (WLAN) includes: determining, at a communication device, that the PHY data unit is to be transmitted according to a hybrid automatic repeat request (HARQ) process; generating, at a communication device, a PHY data portion of the PHY data unit, wherein generating the PHY data portion comprises: generating one or more PHY protocol service data units (PSDUs), and in response to determining that the PHY data unit is to be transmitted according to the HARQ process, individually encoding PSDUs of the one or more PSDUs. The method also includes: generating, at a communication device, a PHY preamble, wherein generating the PHY preamble comprises: generating a first signal field in the PHY preamble, and in response to determining that the PHY data unit is to be transmitted according to the HARQ process: including in the first signal field an indicator to indicate that the PHY preamble includes a second signal field with HARQ information regarding the PHY data unit, and generating the second signal field to include one or more indications of one or more durations of the one or more respective PSDUs within the PHY data portion, wherein the second signal field is separate from the first signal field.

In another embodiment, a wireless communication device comprises: a network interface device associated with a first communication device. The network interface device is implemented on one or more integrated circuit (IC) devices, and the one or more IC devices are configured to: determine that a PHY data unit is to be transmitted according to a HARQ process, and generate a PHY data portion of the PHY data unit, comprising: generating one or more PSDUs, and in response to determining that the PHY data unit is to be transmitted according to the HARQ process, individually encoding PSDUs of the one or more PSDUs. The one or more IC devices are further configured to: generate a PHY preamble, comprising: generating a first signal field in the PHY preamble, and in response to determining that the PHY data unit is to be transmitted according to the HARQ process: including in the first signal field an indicator to indicate that the PHY preamble includes a second signal field with HARQ information regarding the PHY data unit, and generating the second signal field to include one or more indications of one or more durations of the one or more respective PSDUs within the PHY data portion, wherein the second signal field is separate from the first signal field.

In yet another embodiment, a method for processing a PHY data unit in a WLAN includes: receiving, at a communication device, the PHY data unit via a wireless communication channel; analyzing, at the communication device, a first signal field in a PHY preamble of the PHY data unit to determine that the PHY preamble includes a second signal field with HARQ information regarding the PHY data unit; in response to determining that the PHY preamble includes the second signal field, analyzing, at the communication device, the second signal field to determine one or more durations of one or more respective PSDUs within a PHY data portion of the PHY data unit; and using, at the communication device, the one or more durations of the one or more respective PSDUs to decode information included in at least one of the one or more PSDUs according to a HARQ process.

In still another embodiment, a wireless communication device comprises: a network interface device associated with a first communication device. The network interface device is implemented on one or more IC devices, and the one or more IC devices are configured to: receive a PHY data unit via a wireless communication channel of a wireless local area network, analyze a first signal field in a PHY preamble of the PHY data unit to determine that the PHY preamble includes a second signal field with HARQ information regarding the PHY data unit, in response to determining that the PHY preamble includes the second signal field, analyze the second signal field to determine one or more durations of one or more respective PHY protocol service data units (PSDUs) within a PHY data portion of the PHY data unit, and use the one or more durations of the one or more respective PSDUs to decode information included in at least one of the one or more PSDUs according to a HARQ process.

BRIEF DESCRIPTION OF THE DRAWINGS

FIG. 3A is a diagram of an example HARQ signal field, according to an embodiment.

FIG. 3B is a diagram of an example HARQ PSDU information subfield included in the HARQ signal field of FIG. 3A, according to an embodiment.

FIG. 3C is a diagram of another example HARQ PSDU information subfield included in the HARQ signal field of FIG. 3A, according to another embodiment.

DETAILED DESCRIPTION

As discussed above, physical layer (PHY) protocol data unit (PPDU) formats defined by current wireless local area network (WLAN) protocols make the use of Hybrid automatic repeat request (HARQ) prohibitive. For instance, the current WLAN protocols mandate that multiple media access control (MAC) protocol data units (MPDUs) aggregated together (referred to as an aggregate MPDU (A-MPDU)) within one PPDU are all encoded as one entity. As a result, there is no mechanism to ensure that the coded bits corresponding to each MPDU in a first transmission and in subsequent retransmissions are identical unless the entire A-MPDU is retransmitted. But retransmitting the entire A-MPDU if only a small fraction of MPDUs are not correctly received wastes radio resource, which will offset the benefits of using HARQ.

In embodiments disclosed herein, efficient PHY preamble designs for PPDUs and/or other PPDU format changes facilitate using HARQ with WLAN communications. For instance, in some embodiments described below, when multiple MPDUs are to be aggregated as an A-MPDU within one PPDU and when HARQ is to be used, each MPDU is individually encoded. Because each MPDU is individually encoded, a receiver needs to know boundaries between the encoded MPDUs in order to decode the MPDUs correctly, according to embodiments described below. Therefore, in some embodiments described below, an additional signal field is included in a PHY preamble of the PPDU, where the additional signal field includes HARQ-related information regarding the PPDU, such as indications of boundaries between encoded MPDUs in the PPDU, according to an embodiment. A receiver uses information in the additional signal field to process the individual MPDUs within the PPDU as part of a HARQ process, according to an embodiment.

In another embodiment, one or more MPDUs are jointly encoded and included in each of multiple fixed length PHY service data units (PSDUs) within a PPDU when HARQ is used. Because the lengths of the PSDUs are fixed and known to a receiver, the receiver can individually decode each PSDU as part of a HARQ process.

In another embodiment, padding is used so that each encoded MPDU in a PPDU occupies an integer number of orthogonal frequency division multiplexing (OFDM) symbols, which facilitates a receiver identifying boundaries between encoded MPDUs for a HARQ process. In another embodiment, each encoded MPDU in a PPDU is not required to include an integer number of OFDM symbols, which reduces the amount of padding in at least some instances as compared to requiring that each encoded MPDU include an integer number of OFDM symbols; rather, padding is added to a last-occurring MPDU in the PPDU so that a PHY data portion of the PPDU includes an integer number of OFDM symbols.

Figure 1:
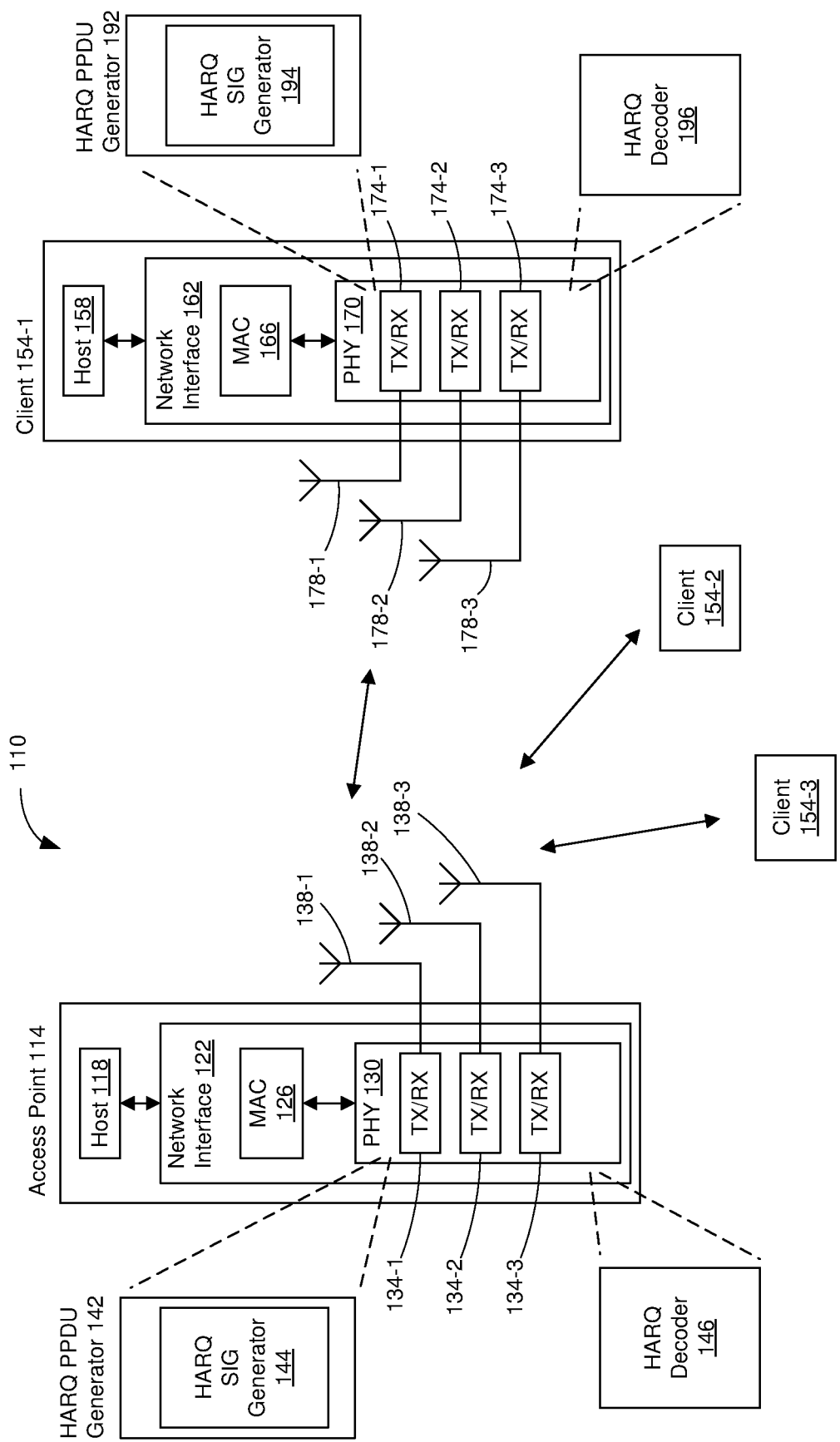
FIG. 1 is a block diagram of an example wireless local area network (WLAN) in which communication devices exchange physical layer (PHY) data units according to a hybrid automatic repeat request (HARQ) process, according to an embodiment.

FIG. 1 is a block diagram of an example WLAN 110, according to an embodiment. The WLAN 110 includes an access point (AP) 114 that is configured to transmit and receive PPDUs that are formatted for HARQ. The AP 114 comprises a host processor 118 coupled to a network interface device 122. The network interface 122 includes a media access control (MAC) layer processor 126 (referred to as a "MAC processor") and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MPDUs, A-MPDUs, etc., and provide the MAC layer data units to the PHY processor 130.

In an embodiment, the MAC processor 126 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 126, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 126 to add the determined number of padding bits to the MPDU.

The PHY processor 130 is configured to receive MAC layer data units from the MAC processor 126 and encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In an embodiment, the PHY processor 130 includes one or more forward error correction (FEC) encoders that are configured to encode bits in a MAC layer data unit according to one or more FEC coding schemes. For example, the PHY processor 130 includes a binary convolutional code (BCC) encoder, according to an embodiment. As another example, the PHY processor 130 additionally or alternatively includes a low density parity check (LDPC) encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 130, wherein the processor executes machine readable instructions that, when executed by the processor, cause the processor to encode bits in a MAC layer data unit according to an FEC coding scheme.

Similarly, in an embodiment, the PHY processor 130 includes one or more FEC decoders that are configured to decode bits in a PHY data unit according to one or more FEC coding schemes. For example, the PHY processor 130 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 130, wherein the processor executes machine readable instructions that, when executed by the processor, cause the processor to decode bits in a PHY data unit according to an FEC coding scheme.

In an embodiment, the PHY processor 130 includes a padding unit that is configured to determine a number of padding bits to be added to a PHY data unit, and to add the determined number of padding bits to the PHY data unit. In an embodiment, some padding bits are added to the PHY data unit prior to the PHY processor 130 performing FEC encoding of the PHY data unit, and some padding bits are added to the PHY data unit after the PHY processor 130 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 130, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 130 to add the determined number of padding bits to the PHY data unit.

In various embodiments, the MAC processor 126 is configured to generate and process MAC layer data units such as described herein. In various embodiments, the PHY processor 130 is configured to generate and process PHY data units such as described herein.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the PHY processor 130 includes a HARQ PPDU generator 142 that is configured to generate PPDUs that are formatted for HARQ transmissions (sometimes referred to herein as "HARQ PPDUs"), according to an embodiment. For example, the HARQ PPDU generator 142 is configured to generate HARQ PPDUs such as described herein. In an embodiment, the HARQ PPDU generator 142 includes a HARQ signal (SIG) field generator 144 that is configured to generate SIG fields in PHY preambles of HARQ PPDUs, wherein the SIG field includes HARQ-related information regarding the HARQ PPDUs, such as indications of boundaries between encoded MPDUs in each PPDU, according to an embodiment. Such SIG fields are sometimes referred to herein as "HARQ SIG fields." For example, the HARQ PPDU generator 144 is configured to generate HARQ SIG fields such as described herein.

In an embodiment, the HARQ PPDU generator 142 is implemented by a processor configured to execute machine readable instructions stored in a memory device (not shown) such as a RAM, a ROM, a flash memory, etc. In an embodiment, the HARQ PPDU generator 142 additionally or alternatively includes a hardware state machine that is configured to generate HARQ PPDUs such as described herein. Similarly, the HARQ SIG field generator 144 is implemented by a processor configured to execute machine readable instructions stored in a memory device (not shown) such as a RAM, a ROM, a flash memory, etc. In an embodiment, the HARQ SIG field generator 144 additionally or alternatively includes a hardware state machine that is configured to generate delimiter fields such as described herein.

In an embodiment, the PHY processor 130 also includes a HARQ decoder 146 that is configured to decode an MPDU by "soft combining" an original transmission of the MPDU and one or more retransmissions of the MPDU. The HARQ decoder 146 is configured to use HARQ-related information in a HARQ SIG field of a HARQ PPDU to identify within the HARQ PPDU a beginning of the MPDU and an end of the MPDU so that the MPDU can be "soft combined" with another transmission of the MPDU, according to an embodiment.

In an embodiment, the HARQ decoder 146 is implemented by a processor configured to execute machine readable instructions stored in a memory device (not shown) such as a RAM, a ROM, a flash memory, etc. In an embodiment, the HARQ decoder 146 additionally or alternatively includes a hardware state machine that is configured to process HARQ SIG fields such as described herein and/or identify MPDUs within HARQ PPDUs such as described herein.

The WLAN 110 includes a plurality of client stations 154 that are configured to transmit and receive HARQ PPDUs. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, A-MPDUs, etc., and provide the MAC layer data units to the PHY processor 170.

In an embodiment, the MAC processor 166 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 166, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 166 to add the determined number of padding bits to the MPDU.

The PHY processor 170 is configured to receive MAC layer data units from the MAC processor 166 and encapsulate the MAC layer data units to generate PHY data units such as PPDUs, PSDUs, etc., for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, the PHY processor 170 includes one or more FEC encoders that are configured to encode bits in a MAC layer data unit according to one or more FEC coding schemes. For example, the PHY processor 170 includes a BCC encoder, according to an embodiment. As another example, the PHY processor 170 additionally or alternatively includes an LDPC encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 170, wherein the processor executes machine readable instructions that, when executed by the processor, cause the processor to encode bits in a MAC layer data unit according to an FEC coding scheme.

Similarly, in an embodiment, the PHY processor 170 includes one or more FEC decoders that are configured to decode bits in a PHY data unit according to one or more FEC coding schemes. For example, the PHY processor 170 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 170, wherein the processor executes machine readable instructions that, when executed by the processor, cause the processor to decode bits in a PHY data unit according to an FEC coding scheme.

In an embodiment, the PHY processor 170 includes a padding unit that is configured to determine a number of padding bits to be added to a PHY data unit, and to add the determined number of padding bits to the PHY data unit. In an embodiment, some padding bits are added to the PHY data unit prior to the PHY processor 170 performing FEC encoding of the PHY data unit, and some padding bits are added to the PHY data unit after the PHY processor 170 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 170, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 170 to add the determined number of padding bits to the PHY data unit.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the PHY processor 170 includes a HARQ PPDU generator 192 that is configured to generate HARQ PPDUs, according to an embodiment. For example, the HARQ PPDU generator 192 is configured to generate HARQ PPDUs such as described herein. In an embodiment, the HARQ PPDU generator 192 includes a HARQ SIG field generator 194 that is configured to generate HARQ SIG fields in PHY preambles of HARQ PPDUs, according to an embodiment. For example, the HARQ PPDU generator 194 is configured to generate HARQ SIG fields such as described herein.

In an embodiment, the HARQ PPDU generator 192 is implemented by a processor configured to execute machine readable instructions stored in a memory device (not shown) such as a RAM, a ROM, a flash memory, etc. In an embodiment, the HARQ PPDU generator 192 additionally or alternatively includes a hardware state machine that is configured to generate HARQ PPDUs such as described herein. Similarly, the HARQ SIG field generator 194 is implemented by a processor configured to execute machine readable instructions stored in a memory device (not shown) such as a RAM, a ROM, a flash memory, etc. In an embodiment, the HARQ SIG field generator 194 additionally or alternatively includes a hardware state machine that is configured to generate delimiter fields such as described herein.

In an embodiment, the PHY processor 130 also includes a HARQ decoder 196 that is configured to decode an MPDU by "soft combining" an original transmission of the MPDU and one or retransmissions of the MPDU. The HARQ decoder 196 is configured to use HARQ-related information in a HARQ SIG field of a HARQ PPDU to identify within the HARQ PPDU a beginning of the MPDU and an end of the MPDU so that the MPDU can be "soft combined" with another transmission of the MPDU, according to an embodiment.

In an embodiment, the HARQ decoder 196 is implemented by a processor configured to execute machine readable instructions stored in a memory device (not shown) such as a RAM, a ROM, a flash memory, etc. In an embodiment, the HARQ decoder 196 additionally or alternatively includes a hardware state machine that is configured to process HARQ SIG fields such as described herein and/or identify MPDUs within HARQ PPDUs such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2:
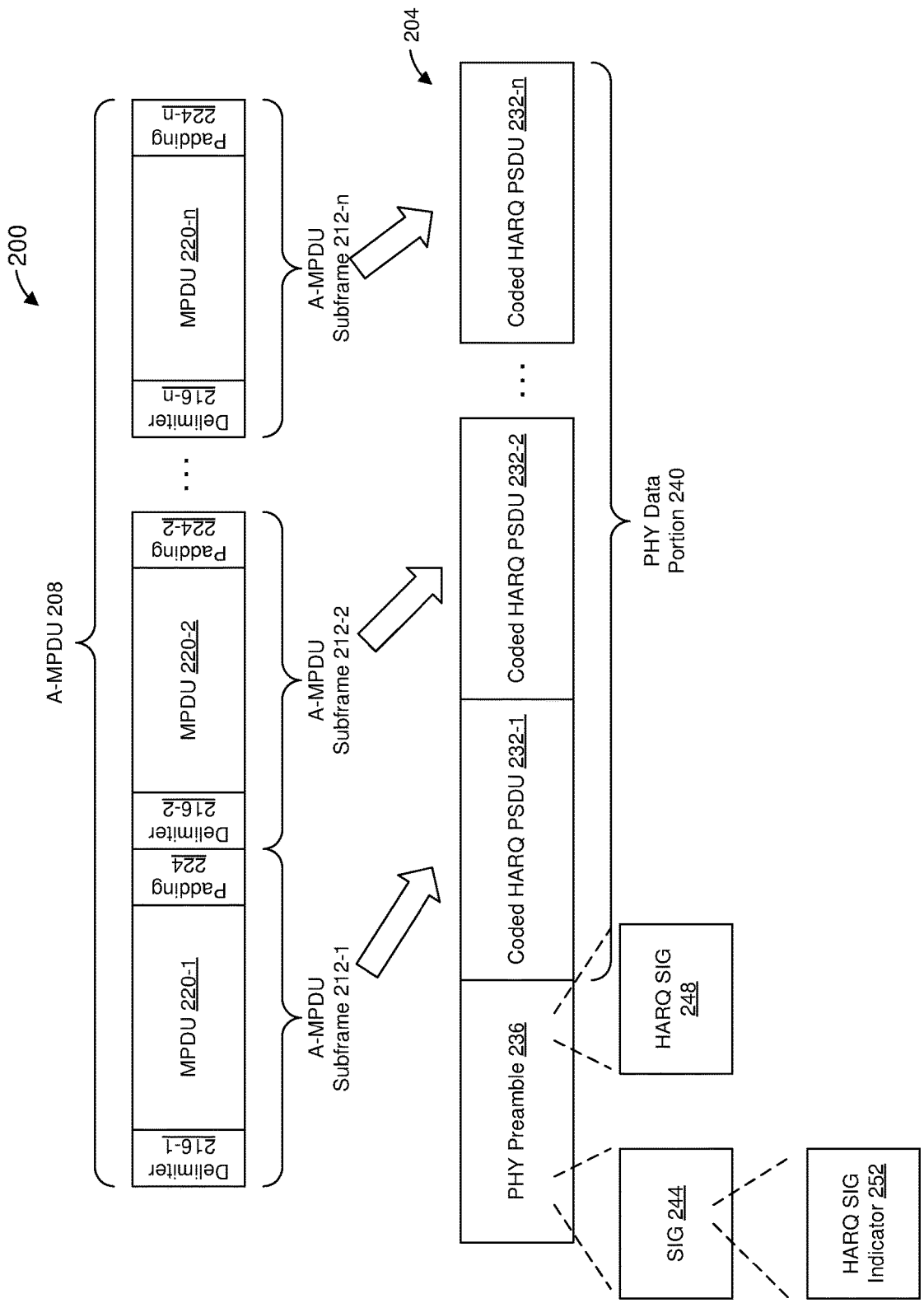
FIG. 2 is a diagram of an example process for generating a PHY data unit that includes i) a plurality of individually encoded HARQ PHY protocol service data units (PSDUs) in a PHY data portion, and ii) a PHY preamble with a HARQ signal field, according to an embodiment.

FIG. 2 is a diagram of an example process 200 for generating a PPDU that is formatted for a HARQ transmission (i.e., a "HARQ PPDU"), according to an embodiment. The network interface 122 is configured to perform the process 200, according to an embodiment. Similarly, the network interface 162 is configured to perform the process 200, according to an embodiment. In other embodiments, another suitable WLAN network interface performs the process 200.

The process 200 involves generating a HARQ PPDU 204 using an A-MPDU 208. In an embodiment, the network interface 122/162 is configured to generate the HARQ PPDU 204. In an embodiment, the PHY processor 130/170 is configured to generate the HARQ PPDU 204. In an embodiment, the HARQ PPDU generator 142/192 is configured to generate the HARQ PPDU 204.

In an embodiment, a MAC processor, such as the MAC processor 126 or the MAC processor 166, generates the A-MPDU 208. The A-MPDU 208 includes a plurality of A-MPDU subframes 212, where each A-MPDU subframe 212 corresponds to a PSDU that is to be individually encoded for a HARQ transmission (sometimes referred to herein as a "HARQ-PSDU"), according to an embodiment. Each A-MPDU subframe 212 includes an MPDU delimiter 216, an MPDU 220, and optional padding bits 224.

Each A-MPDU subframe 212 is individually encoded by an FEC encoder to generate a coded HARQ PSDU 232. For example, an FEC encoder of a PHY processor, such as the PHY processor 130 or the PHY processor 170, individually encodes each A-MPDU subframe 212 to generate a coded HARQ PSDU 232, according to an embodiment. Individually encoding each A-MPDU subframe 212 facilitates a receiver to perform "soft combining" of an original transmission of the A-MPDU subframe 212 and one or more retransmissions of the A-MPDU subframe 212 as part of a HARQ scheme without having to retransmit the entire A-MPDU 208. In an embodiment, the FEC encoder is a BCC encoder. In another embodiment, the FEC encoder is an LDPC encoder.

In other embodiments, multiple A-MPDU subframes are jointly encoded by an FEC encoder to generate a coded HARQ PSDU 232, as is discussed in more detail below. For example, if individual MPDUs are of relatively small sizes, it may be inefficient to individually encode each MPDU as compared to jointly encoding multiple small-sized MPDUs. Retransmitting the jointly encoded small-sized MPDUs will not detrimentally affect system performance, at least in some instances.

The HARQ PPDU 204 is generated to include the HARQ PSDUs 232 and a PHY preamble 236. The PHY preamble 236 includes training signals (not shown) for performing one or more of packet detection, synchronization, automatic gain control (AGC) adjustment, channel estimation, etc. Additionally, the PHY preamble 236 includes a plurality of signal (SIG) fields that include indications of PHY parameters corresponding to a PHY data portion 240 of the PPDU 204 and which a receiver uses to demodulate and decode the PHY data portion 240. Examples of PHY parameters indicated by the plurality of SIG fields includes one or more of a modulation and coding scheme (MCS) applied to the PHY data portion 240 by a transmitter, a duration of the PHY data portion 240, a type of FEC encoding employed, etc.

The plurality of SIG fields includes a SIG field 244 that is included in PPDUs even when HARQ is not being used. Accordingly, the SIG field 244 includes indications of PHY parameters that are not related to HARQ transmission. The plurality of SIG fields also includes a SIG field 248 that includes indications of HARQ-related parameters (sometimes referred to herein as a "HARQ SIG field") and is only included in PPDUs for which HARQ is being used. Because the HARQ SIG field 248 is only included in PPDUs for which HARQ is being used, the SIG field 244 is configured to indicate whether the PPDU 204 includes the HARQ SIG field 248. For example, the SIG field 244 includes an indicator 252 that indicates whether the PPDU 204 includes the HARQ SIG field 248.

In some embodiments, the SIG field 244 is configured to indicate whether the PPDU 204 includes the HARQ SIG field 248. In other embodiments, the SIG field 244 is additionally configured to indicate one or more other parameters regarding the HARQ SIG field 248. For example, in various embodiments, the SIG field 244 is additionally configured to indicate one of, or any suitable combination of two or more of, i) a modulation scheme used to transmit the HARQ SIG field 248, ii) an FEC encoding scheme used to encode the HARQ SIG field 248, iii) an MCS used for the HARQ SIG field 248, iv) a length in bits of the HARQ SIG field 248, v) a duration of the HARQ SIG field 248 (e.g., indicated as a number of OFDM symbols), etc. In embodiments in which the SIG field 244 is additionally configured to indicate one or more other parameters (such as described above) regarding the HARQ SIG field 248, a receiver uses the indicated one or more other parameters in the SIG field 244 to properly process (e.g., one or more of demodulate, decode, etc.) the HARQ SIG field 248.

In some embodiments, PPDUs have different formats corresponding to different transmission modes or types. As an illustrative example, two or more PPDU formats correspond to two or more of the following example transmission modes: a single user (SU) mode, a multi-user (MU) mode, a trigger-based transmission mode, an extended range transmission mode, etc. Thus, in some embodiments, the PHY preamble 236 and/or the PHY data portion 240 have different formats depending on a particular transmission mode according to which the HARQ PPDU 204 is to be transmitted.

In some embodiments, the SIG field 244 is defined by a new wireless communication protocol. For example, the SIG field defined by the new wireless communication protocol includes one or more fields that are used to indicate whether the PPDU 204 includes the HARQ SIG field 248 and/or to indicate one or more other parameters related to the HARQ SIG field 248. As another example, when the SIG field 244 indicates that the PPDU 204 includes the HARQ SIG field 248, one or more bits and/or one or more subfields of the SIG field are repurposed to indicate one or more other parameters related to the HARQ SIG field 248. For example, when a PPDU is a non-HARQ PPDU, an MCS subfield in the SIG field 244 indicates an MCS used for the PHY data portion of the PPDU, whereas when the PPDU is a HARQ PPDU, the MCS subfield in the SIG field 244 indicates an MCS used for the HARQ SIG field 248, according to an embodiment. Similarly, one or more other subfields related to one or more other PHY parameters that are relevant for non-HARQ PPDUs but are not relevant for HARQ PPDUs are repurposed to provide one or more HARQ-related parameters such as i) a modulation scheme used to transmit the HARQ SIG field 248, ii) an FEC encoding scheme used to encode the HARQ SIG field 248, iii) a length in bits of the HARQ SIG field 248, iv) a duration of the HARQ SIG field 248 (e.g., indicated as a number of OFDM symbols), etc., in some embodiments. Similarly, one or more other subfields related to one or more other PHY parameters that are relevant for a PHY data portion of a HARQ PPDU are repurposed to provide one or more HARQ-related parameters such as i) a modulation scheme used to transmit the HARQ SIG field 248, ii) an FEC encoding scheme used to encode the HARQ SIG field 248, iii) a length in bits of the HARQ SIG field 248, iv) a duration of the HARQ SIG field 248 (e.g., indicated as a number of OFDM symbols), etc., and the PHY parameters that are relevant for the PHY data portion of a HARQ PPDU are indicated in the HARQ SIG field 248, according to some embodiments. Examples of subfields that are repurposed in various embodiments include one or more of i) a dual carrier modulation (DCM) field that indicates whether DCM is used for the PHY data portion, ii) a pre-FEC padding factor subfield that indicates a segment boundary in a last-occurring OFDM symbol of the PHY data portion, wherein padding bits are added prior to FEC encoding so that the FEC encoded bits end at the indicated segment boundary in the last-occurring OFDM symbol (in an embodiment, four segment boundaries are defined for an OFDM symbol, corresponding to four segments in the OFDM symbol; in other embodiments, another suitable quantity of segment boundaries are defined, such as 2, 3, 5, etc.), iii) a packet extension (PE) field disambiguity subfield which includes a parameter related to a PE field added to the PPDU (the parameter is used by a receiver to calculate a number of OFDM symbols in the PPDU), iv) an LDPC extra symbol segment subfield that indicates whether an extra OFDM symbol segment is present for pre-FEC padding when LDPC is used for encoding the PHY data portion, v) a space-time block code (STBC) subfield that is used to indicate whether STBC is used for the PHY data portion, etc.

In some embodiments, the SIG field 244 has a format based on a SIG field defined by a legacy wireless communication protocol. For example, the SIG field defined by the legacy wireless communication protocol may define one or more bits, and/or one or more fields that are designated as "reserved," and one or more of such reserved bits/fields are used to indicate whether the PPDU 204 includes the HARQ SIG field 248 and/or to indicate one or more other parameters related to the HARQ SIG field 248. As another example, when the SIG field 244 indicates that the PPDU 204 includes the HARQ SIG field 248, one or more bits and/or one or more subfields of the SIG field defined by the legacy wireless communication protocol are repurposed to indicate one or more other parameters related to the HARQ SIG field 248.

In an embodiment, the SIG field 244 has a format based on a SIG field defined by the current draft of the IEEE 802.11ax Standard. Table 1 is a listing of subfields in the HE-SIG-A field for SU PPDUs and extended range (ER) SU PPDUs according to the current draft of the IEEE 802.11ax Standard. The SU PPDU format defined by the current draft of the IEEE 802.11ax Standard may be considered to correspond to a non-ER transmission mode, and thus the term "SU PPDU" may be considered to cover both the non-ER SU PPDU format and the ER SU PPDU format.

TABLE 1

| Bit | Subfield Name | # of bits | Description |
|---|---|---|---|
| B0 | Format | 1 | For differentiating an HE SU PPDU and an HE ER SU PPDU from an HE trigger-based (TB) PPDU: Set to 1 for an HE SU PPDU and HE ER SU PPDU |
| B2 | Beam Change | 1 | Set to 1 to indicate that pre-HE modulated fields of the PPDU are spatially mapped differently from a first symbol of an HE-LTF (long training field). Set to 0 to indicate that the pre-HE modulated fields of the PPDU are spatially mapped the same way as the first symbol of the HE-LTF on each tone. |
| B2 | UL/DL | 1 | Indicates whether the PPDU is sent in the uplink direction or in the downlink direction. |
| B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone resource unit): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| B7 | DCM | 1 | Indicates whether or not dual carrier modulation (DCM) is applied to the Data field for the MCS indicated. If the STBC field is 0, then set to 1 to indicate that DCM is applied to the Data field. Neither DCM nor STBC shall be applied if both the DCM and STBC are set to 1. Set to 0 to indicate that DCM is not applied to the Data field. |
| B8-B13 | BSS Color | 6 | The BSS Color field is an identifier of the BSS. |
| B14 | Reserved | 1 | Reserved and set to 1 |
| B15-B18 | Spatial Reuse | 4 | Indicates whether or not spatial reuse is allowed during the transmission of this PPDU. |
| B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| B21-B22 | GI + LTF Size | 2 | Indicates the GI duration and HE-LTF size. Set to 0 to indicate a 1x HE-LTF and 0.8 μs GI Set to 1 to indicate a 2x HE-LTF and 0.8 μs GI Set to 2 to indicate a 2x HE-LTF and 1.6 μs GI Set to 3 to indicate: a 4x HE-LTF and 0.8 μs GI if both the DCM and STBC fields are 1. Neither DCM nor STBC shall be applied if both the DCM and STBC fields are set to 1. a 4x HE-LTF and 3.2 μs GI, otherwise. |
| B23-B25 | NSTS and Midamble Periodicity | 3 | If the Doppler field is 0, indicates the number of spacetime streams. Set to the number of space-time streams minus 1. For an HE ER SU PPDU, values 2 to 7 are reserved. If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved. B25 is set to 0 for a midamble periodicity of 10 OFDM symbols, and set to 1 for a midamble periodicity of 20 OFDM symbols. |

TABLE 1-continued

| Bit | Subfield Name | # of bits | Description |
| --- | --- | --- | --- |
| B26-B32 | TXOP | 7 | Indicates transmit opportunity period (TXOP) duration |
| B33 | Coding | 1 | Indicates whether BCC or LDPC is used |
| B34 | LDPC Extra Symbol Segment | 1 | Indicates whether an extra OFDM symbol segment is present for pre-FEC padding when LDPC is used. Reserved and set to 1 if BCC is used. |
| B35 | STBC | 1 | Indicates whether space-time block encoding (STBC) is used |
| B36 | Beamformed | 1 | Indicates whether beamforming is used |
| B37-B38 | Pre-FEC padding factor | 2 | Padding bits are added prior to FEC encoding so that the FEC encoded bits end at a boundary in an OFDM symbol. The Pre-FEC padding factor indicates the boundary. |
| B39 | PE Disambiguity | 1 | A parameter related to a packet extension field added to the PPDU. The parameter is used by a receiver to calculate a number of OFDM symbols in the PPDU. |
| B40 | Reserved | 1 | Reserved and set to 1. |
| B41 | Doppler | 1 | Indicates whether one or more midambles are present in the PPDU and/or whether midambles should be used in a reverse link. |
| B42-B45 | CRC | 4 | Cyclic redundancy check (CRC) bits for bits 0-41 of the HE-SIG-A field. |
| B46-B51 | Tail | 6 | Used to terminate a trellis of a convolutional decoder used to encode the HE-SIG-A field. |

In various embodiments, one or more of the bits designated as "reserved" in Table 1 are used to indicate whether the PPDU 204 includes the HARQ SIG field 248, and optionally to indicate one or more other parameters regarding the HARQ SIG field 248.

The current draft of the IEEE 802.11ax Standard defines the values 12-15 for the 4-bit MCS subfield as reserved. Thus, in an embodiment, the MCS subfield is set to any value in the range 12-15 to indicate that the PPDU 204 includes the HARQ SIG field 248, whereas when the MCS subfield is set to any value in the range 0-11, the PPDU 204 does not include the HARQ SIG field 248.

In an embodiment in which the HARQ SIG field 248 can be modulated/encoded according to different MCSs, the MCS subfield is set to a value that indicates the MCS according to which the HARQ SIG field 248 is modulated/encoded. As an illustrative example, the MCS subfield is set to any value in the range 12-15 to indicate that the PPDU 204 includes the HARQ SIG field 248 and the MCS according to which the HARQ SIG field 248 is modulated/encoded is 12 minus the value in the MCS subfield, according to an embodiment. In such embodiments, the MCS according to which the PHY data portion is modulated/encoded is indicated in the HARQ SIG field 248, as is discussed below.

In an embodiment in which DCM can optionally be used for the HARQ SIG field 248, the DCM subfield is set to a value that indicates whether DCM is used for the HARQ SIG field 248. In such embodiments, whether DCM is used for the PHY data portion is modulated/encoded is indicated in the HARQ SIG field 248, as is discussed below.

In an embodiment in which different types of HARQ can be used (e.g., chase combining (CC), incremental redundancy (IR), etc.), one or more bits of the SIG field 244 are used to indicate the type of HARQ used for the PPDU 204. In an illustrative embodiment, when the SIG field 244 indicates that the HARQ SIG field 248 is included in the PPDU 204, the LDPC Extra Symbol Segment subfield is repurposed to indicate the type of HARQ used for the PPDU 204.

In an embodiment in which a length or duration of the HARQ SIG field 248 is variable, one or more bits of the SIG field 244 are used to indicate the length/duration of the HARQ SIG field 248. In an illustrative embodiment, when the SIG field 244 indicates that the HARQ SIG field 248 is included in the PPDU 204, bits 37-40 (e.g., the Pre-FEC Padding Factor, the PE Disambiguity, and the Reserved subfields) are repurposed to indicate a number of OFDM symbols of the HARQ SIG field 248. In such embodiments, Pre-FEC Padding Factor and PE Disambiguity information is included in the HARQ SIG field 248, as is discussed below.

In some embodiments, bit B14 (Reserved) is set to zero to indicate that the HARQ SIG field 248 is included in the PPDU 204. In some embodiments in which bit B14 (Reserved) is set to zero to indicate that the HARQ SIG field 248 is included in the PPDU 204 and a length or duration of the HARQ SIG field 248 is variable, one or more bits of the SIG field 244 are used to indicate the length/duration of the HARQ SIG field 248. In an illustrative embodiment, when bit B14 (Reserved) is set to zero, bits 37-40 (e.g., the Pre-FEC Padding Factor, the PE Disambiguity, and the Reserved subfields) are repurposed to indicate a number of OFDM symbols of the HARQ SIG field 248. In such embodiments, Pre-FEC Padding Factor and PE Disambiguity information is included in the HARQ SIG field 248, as is discussed below. In some embodiments in which bit B14 (Reserved) is set to zero to indicate that the HARQ SIG field 248 is included in the PPDU 204, the MCS used for the HARQ SIG field 248 is fixed, and the MCS subfield indicates the MCS used for the PHY data portion of the PPDU 204. In some embodiments in which bit B14 (Reserved) is set to zero to indicate that the HARQ SIG field 248 is included in the PPDU 204, DCM is never used for the HARQ SIG field 248, and the DCM subfield indicates whether DCM is used for the PHY data portion of the PPDU 204. In some embodiments in which bit B14 (Reserved) is set to zero to indicate that the HARQ SIG field 248 is included in the PPDU 204, DCM is always used for the HARQ SIG field 248, and the DCM subfield indicates whether DCM is used for the PHY data portion of the PPDU 204.

FIG. 3A is a diagram of an example HARQ SIG field 300 that is included in a PHY preamble of a HARQ PPDU, according to an embodiment. For example, the HARQ SIG field 300 is used as the HARQ SIG field 248 of FIG. 2, according to an embodiment.

In an embodiment, the network interface 122/162 is configured to generate the HARQ SIG field 300. In an embodiment, the PHY processor 130/170 is configured to generate the HARQ SIG field 300. In an embodiment, the HARQ PPDU generator 142/192 is configured to generate the HARQ SIG field 300. In an embodiment, the HARQ SIG field generator 144/194 is configured to generate the HARQ SIG field 300.

In embodiments in which an MCS subfield in the SIG field 244 is repurposed to indicate an MCS used for the HARQ SIG field 300 and/or to indicate that the HARQ PPDU includes the HARQ SIG field 300, the HARQ SIG field 300 includes an MCS subfield 304 that indicates an MCS used for the PHY data portion of the HARQ PPDU. In embodiments in which the MCS subfield in the SIG field 244 is not so repurposed, the HARQ SIG field 300 does not include the MCS subfield 304. The MCS subfield 304 includes a suitable number of bits for specifying an MCS from a suitable set of different MCSs. For example, when the MCS subfield 304 consists of four bits, the set of different MCSs can include up to sixteen different MCSs. As another example, when the MCS subfield 304 consists of three bits, the set of different MCSs can include up to eight different MCSs. Other suitable numbers of bits are used in other embodiments.

In embodiments in which a DCM subfield in the SIG field 244 is repurposed to indicate whether DCM is used for the HARQ SIG field 300, the HARQ SIG field 300 includes a DCM subfield 308 that indicates whether DCM is used for the PHY data portion of the HARQ PPDU. In embodiments in which the DCM subfield in the SIG field 244 is not so repurposed, the HARQ SIG field 300 does not include the DCM subfield 308. In an embodiment, the DCM subfield 308 consists of one bit. Other suitable numbers of bits are used in other embodiments.

The HARQ SIG field 300 includes a respective HARQ PSDU information subfield 312 for each HARQ PSDU included in the HARQ PPDU, according to an embodiment. For instance, in embodiments in which the HARQ SIG field 300 is included in the PPDU 204 of FIG. 2, the HARQ SIG field 300 includes a respective HARQ PSDU information subfield 312 for each coded HARQ PSDU 232. Each HARQ PSDU information subfield 312 includes information for the corresponding HARQ PSDU. In an embodiment, an ordering of the HARQ PSDU information subfields 312 corresponds to an ordering of the HARQ PSDUs in the HARQ PPDU. For example, a first occurring HARQ PSDU information subfield 312 corresponds to a first occurring HARQ PSDU, a second occurring HARQ PSDU information subfield 312 corresponds to a second occurring HARQ PSDU, and so on.

In some embodiments in which a PE field may be added to a PPDU, the HARQ SIG field 300 also includes a PE disambiguity subfield 316. The PE disambiguity subfield 316 includes a parameter related to a PE field added to the PPDU (the parameter is used by a receiver to calculate a number of OFDM symbols in the PPDU).

In some embodiments, the HARQ SIG field 300 also includes an error detection (e.g., a cyclic redundancy check (CRC)) subfield 320. A value of the CRC subfield 320 is generated by applying an error detection code (e.g., a CRC code) to information from the other subfields of the HARQ SIG field 300.

FIG. 3B is a diagram of an example HARQ PSDU information subfield 350 that is included in HARQ SIG field 300, according to an embodiment. For example, the HARQ PSDU information subfield 350 is used as the HARQ PSDU information subfield 312 of FIG. 3A, according to an embodiment.

The HARQ PSDU information subfield 350 includes a duration subfield 354 that indicates a duration of the corresponding HARQ PSDU (e.g., the corresponding coded HARQ PSDU 232). The duration subfield 354 indicates a number of OFDM symbols in the corresponding HARQ PSDU (e.g., the corresponding coded HARQ PSDU 232), according to an embodiment. The duration subfield 354 indicates a time duration value for the corresponding HARQ PSDU (e.g., the corresponding coded HARQ PSDU 232), according to another embodiment. The duration subfield 354 consists of a suitable number, N, of bits. The total number of OFDM symbols in a HARQ PSDU will depend on an error correcting encoding rate that is used, a modulation scheme that is used, and a frequency bandwidth that is used. The MAC processor 126/166 is configured to ensure that an appropriate MAC layer data unit length is used for the error correcting encoding rate, the modulation scheme, and the frequency bandwidth so that the number of OFDM symbols in the HARQ PSDU can be represented by N bits.

The HARQ PSDU information subfield 350 also includes a pre-FEC padding factor subfield 358 that indicates a segment boundary in a last-occurring OFDM symbol of the corresponding HARQ PSDU (e.g., the corresponding coded HARQ PSDU 232), wherein padding bits are added prior to FEC encoding so that the FEC encoded bits end at the indicated segment boundary in the last-occurring OFDM symbol of the corresponding HARQ PSDU (e.g., the corresponding coded HARQ PSDU 232). In other embodiments, the pre-FEC padding factor subfield 358 is omitted from the HARQ PSDU information subfield 350.

The HARQ PSDU information subfield 350 also includes an LDPC extra symbol segment subfield 362 that indicates whether an extra OFDM symbol segment is present in the last-occurring OFDM symbol of the corresponding HARQ PSDU (e.g., the corresponding coded HARQ PSDU 232) for pre-FEC padding when LDPC is used. In other embodiments, the LDPC extra symbol segment subfield 362 is omitted from the HARQ PSDU information subfield 350.

FIG. 3C is a diagram of another example HARQ PSDU information subfield 370 that is included in HARQ SIG field 300, according to another embodiment. For example, the HARQ PSDU information subfield 370 is used as the HARQ PSDU information subfield 312 of FIG. 3A, according to an embodiment.

The HARQ PSDU information subfield 370 includes the duration subfield 354 that indicates the duration of the corresponding HARQ PSDU (e.g., the corresponding coded HARQ PSDU 232), as discussed above with reference to FIG. 3B.

The HARQ PSDU information subfield 370 does not include a pre-FEC padding factor subfield. Rather, a same predetermined segment boundary is used for all HARQ PSDUs. In an embodiment, the same predetermined segment boundary corresponds to all segments in the last-occurring OFDM symbol (e.g., in an embodiment where four segments are defined for an OFDM symbol, the same predetermined segment boundary corresponds to four segments) of the coded HARQ PSDU so that pre-FEC padding results in the coded HARQ PSDU ending on an OFDM symbol boundary.

The HARQ PSDU information subfield 370 does not include an LDPC extra symbol segment subfield. Rather, an extra OFDM symbol is always included for pre-FEC padding when LDPC is used for the PSDU.

In some embodiments, the HARQ PPDU is an MU PPDU that includes independent information for multiple communication devices. For example, the MU PPDU is to be transmitted using orthogonal frequency division multiple access (OFDMA), MU multiple input, multiple output (MU-MIMO), or a hybrid of both OFDMA and MU-MIMO. Referring now to FIG. 2, when the HARQ PPDU 204 is an MU PPDU, the PHY data portion 240 includes multiple PSDUs for multiple different client stations (in different frequency portions for OFDMA, and/or transmitted via different spatial streams for MU-MIMO), the SIG field 244 has a different format than for an SU PPDU, and the HARQ SIG field 248 has a different format than for an SU PPDU, according to an embodiment.

In some embodiments, MU PPDUs include a further SIG field (not shown in FIG. 2) as compared to SU PPDUs, and this further SIG field is sometimes referred to herein as an "MU SIG field." For instance, in an embodiment, the MU SIG field includes information that indicates an allocation of frequency resource units (RUs) in MU PPDU for client stations to which the MU PPDU is intended, indicates which spatial stream(s) is intended for which client stations, which RUs correspond to which client stations, etc. As an illustrative example, the IEEE 802.11ax Standard defines an HE-SIG-B field that is included in MU PPDUs. In an embodiment, the HARQ SIG field 248 is included after the MU SIG field.

In an embodiment, the SIG field 244 for MU PPDUs is defined by a new wireless communication protocol. For example, the SIG field defined by the new wireless communication protocol includes one or more fields that are used to indicate whether the PPDU 204 includes the HARQ SIG field 248 and/or to indicate one or more other parameters related to the HARQ SIG field 248. As another example, when the SIG field 244 indicates that the PPDU 204 includes the HARQ SIG field 248, one or more bits and/or one or more subfields of the SIG field are repurposed to indicate one or more other parameters related to the HARQ SIG field 248. Similarly, one or more other subfields related to one or more other PHY parameters that are relevant for non-HARQ PPDUs but are not relevant for HARQ PPDUs are repurposed to provide one or more HARQ-related parameters such as i) a length in bits of the HARQ SIG field 248, ii) a duration of the HARQ SIG field 248 (e.g., indicated as a number of OFDM symbols), etc., in some embodiments. Similarly, one or more other subfields related to one or more other PHY parameters that are relevant for a PHY data portion of a non-HARQ PPDU are repurposed to provide one or more HARQ-related parameters such as i) a length in bits of the HARQ SIG field 248, ii) a duration of the HARQ SIG field 248 (e.g., indicated as a number of OFDM symbols), etc., and the PHY parameters that are relevant for the PHY data portion of a HARQ PPDU are indicated in the HARQ SIG field 248, according to some embodiments. Examples of subfields that are repurposed in various embodiments include one or more of i) a pre-FEC padding factor subfield that indicates a segment boundary in a last-occurring OFDM symbol of the PHY data portion, wherein padding bits are added prior to FEC encoding so that the FEC encoded bits end at the indicated segment boundary in the last-occurring OFDM symbol, ii) a PE field disambiguity subfield which includes a parameter related to a PE field added to the PPDU (the parameter is used by a receiver to calculate a number of OFDM symbols in the PPDU), iii) an LDPC extra symbol segment subfield that indicates whether an extra OFDM symbol segment is present in the last-occurring OFDM symbol for pre-FEC padding when LDPC is used for encoding the PHY data portion, iv) an STBC subfield that indicates whether STBC is used in the PHY data portion, etc.

In some embodiments, the SIG field 244 for an MU PPDU has a format based on a SIG field for an MU PPDU defined by a legacy wireless communication protocol. For example, the SIG field defined by the legacy wireless communication protocol may define one or more bits, and/or one or more fields that are designated as "reserved," and one or more of such reserved bits/fields are used to indicate whether the PPDU 204 includes the HARQ SIG field 248 and/or to indicate one or more other parameters related to the HARQ SIG field 248. As another example, when the SIG field 244 indicates that the PPDU 204 includes the HARQ SIG field 248, one or more bits and/or one or more subfields of the SIG field defined by the legacy wireless communication protocol are repurposed to indicate one or more other parameters related to the HARQ SIG field 248.

In an embodiment, the SIG field 244 has a format based on a SIG field defined by the current draft of the IEEE 802.11ax Standard. Table 2 is a listing of subfields in the HE-SIG-A field for MU PPDUs according to the current draft of the IEEE 802.11ax Standard.

TABLE 2

| Bit | Subfield Name | # of bits | Description |
| --- | --- | --- | --- |
| B0 | UL/DL | 1 | Indicates whether the PPDU is sent in the uplink direction or in the downlink direction. |
| B1-B3 | SIGB MCS | 3 | Indicates the MCS of a HE-SIG-B field of the MU PPDU: Values 0-5 correspond to MCS 1-5, respectively; values 6 and 7 are reserved. |
| B4 | SIGB DCM | 1 | Indicates whether or not DCM is applied to the HE-SIG-B field. |
| B5-B10 | BSS Color | 6 | The BSS Color field is an identifier of the BSS. |
| B11-B14 | Spatial Reuse | 4 | Indicates whether or not spatial reuse is allowed during the transmission of this PPDU. |
| B15-B27 | Bandwidth | 3 | Set to 0 for 20 MHz Set to 1 for 40 MHz Set to 2 for 80 MHz Set to 3 for 160 MHz and 80 + 80 MHz non-preamble puncturing mode If the SIGB Compression field is 0: Set to 4 for preamble puncturing in 80 MHz, |

TABLE 2-continued

| Bit | Subfield Name | # of bits | Description |
|---|---|---|---|
| | | | where in the preamble only the secondary 20 MHz is punctured.<br>Set to 5 for preamble puncturing in 80 MHz, where in the preamble only one of the two 20 MHz subchannels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. Values 2 and 3 are reserved |
| B18-B21 | Number of HE-SIG-B Symbols or MU-MIMO Users | 4 | If the HE-SIG-B Compression field is set to 0, indicates the number of OFDM symbols in the HE-SIG-B field.<br>If the HE-SIG-B Compression field is set to 1, indicates the number of MU-MIMO users and is set to the number of NU-MIMO users minus 1. |
| B22 | SIGB Compression | 1 | Indicates whether the Common field is present in the HE-SIG-B field |
| B23-B24 | GI + LTF Size | 2 | Indicates the GI duration and HE-LTF size.<br>Set to 0 to indicate a 1x HE-LTF and 0.8 µs GI<br>Set to 1 to indicate a 2x HE-LTF and 0.8 µs GI<br>Set to 2 to indicate a 2x HE-LTF and 1.6 µs GI<br>Set to 3 to indicate a 4x HE-LTF and 3.2 µs GI. |
| B25 | Doppler | 1 | Indicates whether one or more midambles are present in the PPDU and/or whether midambles should be used in a reverse link. |
| B26-B32 | TXOP | 7 | Indicates transmit opportunity period (TXOP) duration |
| B33 | Reserved | 1 | Reserved and set to 1 |
| B34-B36 | Number of HE-LTF Symbols and Midamble Periodicity | 3 | If the Doppler field is 0, indicates the number of HE-LTF symbols.<br>If the Doppler field is 1, then B34-B35 indicates the number of HE-LTF symbols, up to 4, and B36 indicates the midamble periodicity. |
| B37 | LDPC Extra Symbol Segment | 1 | Indicates whether an extra OFDM symbol segment is present for pre-FEC padding when LDPC is used. |
| B38 | STBC | 1 | Indicates whether STBC is used |
| B39-B40 | Pre-FEC padding factor | 2 | Padding bits are added prior to FEC encoding so that the FEC encoded bits end at a boundary in an OFDM symbol. The Pre-FEC padding factor indicates the boundary. |
| B41 | PE Disambiguity | 1 | A parameter related to a packet extension field added to the PPDU. The parameter is used by a receiver to calculate a number of OFDM symbols in the PPDU. |
| B42-B45 | CRC | 4 | Cyclic redundancy check (CRC) bits for bits 0-41 of the HE-SIG-A field. |
| B46-B51 | Tail | 6 | Used to terminate a trellis of a convolutional decoder used to encode the HE-SIG-A field. |

In an embodiment, the reserved bit B33 is used to indicate whether the PPDU 204 includes the HARQ SIG field 248.

In an embodiment in which different types of HARQ can be used (e.g., CC, IR, etc.), one or more bits of the SIG field 244 are used to indicate the type of HARQ used for the PPDU 204. In an illustrative embodiment, when the SIG field 244 indicates that the HARQ SIG field 248 is included in the PPDU 204, the LDPC Extra Symbol Segment subfield is repurposed to indicate the type of HARQ used for the PPDU 204.

In an embodiment in which a length or duration of the HARQ SIG field 248 is variable, one or more bits of the SIG field 244 are used to indicate the length/duration of the HARQ SIG field 248. In an illustrative embodiment, when the SIG field 244 indicates that the HARQ SIG field 248 is included in the PPDU 204, bits 38-41 (e.g., the STBC, the Pre-FEC Padding Factor, and the PE Disambiguity subfields) are repurposed to indicate a number of OFDM symbols of the HARQ SIG field 248. In such embodiments, Pre-FEC Padding Factor and PE Disambiguity information is included in the HARQ SIG field 248, as is discussed below, and STBC is not permitted for HARQ MU transmissions. Due to a constraint on the number bits available to indicate the indicate the length/duration of the HARQ SIG field 248, the MAC processor 126/166 is configured to limit the number of MPDUs that can be transmitted to a single client station in a single MU HARQ PPDU so that the length/duration of the HARQ SIG field 248 can be indicated in the designated number of bits in the SIG field 244. The duration of the HARQ SIG field 248 (e.g., the total number of OFDM symbols in the HARQ SIG field 248) will depend on a number of PSDUs to be indicated in the HARQ SIG field 248, a bandwidth via which the HARQ SIG field 248 will be transmitted, etc.

In an embodiment, a same predetermined MCS is used for all HARQ SIG fields 248 in MU PPDUs.

Figure 4A:
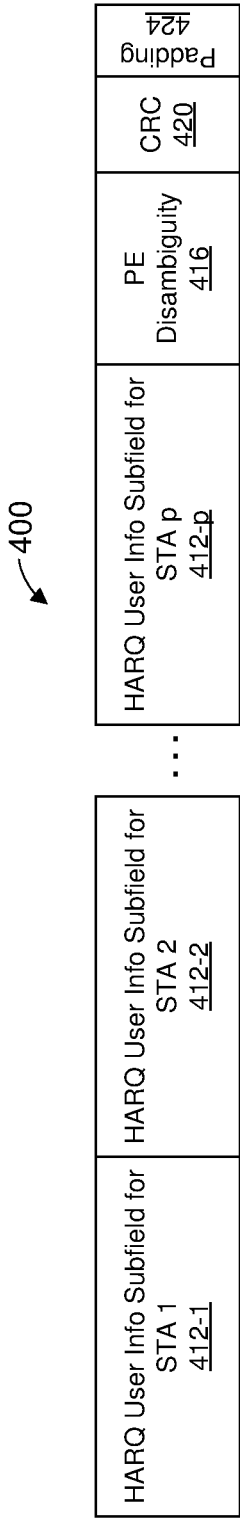
FIG. 4A is a diagram of an example HARQ signal field for a multi-user (MU) PHY data unit, according to an embodiment.

FIG. 4A is a diagram of an example HARQ SIG field 400 that is included in a PHY preamble of an MU HARQ PPDU, according to an embodiment. For example, the HARQ SIG field 400 is used as the HARQ SIG field 248 of FIG. 2 when the HARQ PPDU 204 is an MU HARQ PPDU, according to an embodiment.

In an embodiment, the network interface 122/162 is configured to generate the HARQ SIG field 400. In an embodiment, the PHY processor 130/170 is configured to generate the HARQ SIG field 400. In an embodiment, the HARQ PPDU generator 142/192 is configured to generate the HARQ SIG field 400. In an embodiment, the HARQ SIG field generator 144/194 is configured to generate the HARQ SIG field 400.

The HARQ SIG field 400 includes a respective HARQ user information subfield 412 for each of one or more client stations to which the MU PPDU is to be transmitted, according to an embodiment. As described in more detail below, the HARQ user information subfield 412 includes HARQ-related information for one or more PSDUs to be transmitted to a respective client station.

In an embodiment, an order of the HARQ user information subfields 412 corresponds to an ordering of client stations specified in the MU SIG field (e.g., in an HE-SIG-B field). For example, the MU SIG field (e.g., the HE-SIG-B field) includes allocation information that allocates RUs to client stations, and the allocation information includes a listing of client stations in an order; the order of the HARQ user information subfields 412 corresponds to the order of the listing of client stations in the MU SIG field.

In some embodiments in which a PE field may be added to a PPDU, the HARQ SIG field 400 also includes a PE disambiguity subfield 416. The PE disambiguity subfield 416 includes a parameter related to a PE field added to the PPDU (the parameter is used by a receiver to calculate a number of OFDM symbols in the PPDU).

In some embodiments, the HARQ SIG field 400 also includes an error detection (e.g., a cyclic redundancy check (CRC)) subfield 420. A value of the CRC subfield 420 is generated by applying an error detection code (e.g., a CRC code) to information from the other subfields of the HARQ SIG field 400.

In some embodiments and/or scenarios, the HARQ SIG field 400 also includes padding 424, which will be described in more detail below.

Figure 4B:
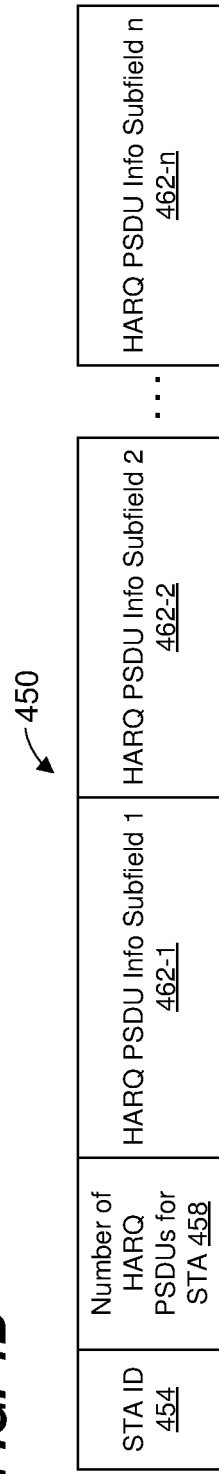
FIG. 4B is a diagram of an example HARQ user information subfield included in the HARQ signal field of FIG. 4A, according to an embodiment.

FIG. 4B is a diagram of an example HARQ user information subfield 450, according to an embodiment. For example, the HARQ user information subfield 450 is used as the HARQ user information subfield 412 of FIG. 4A, according to an embodiment.

The HARQ user information subfield 450 includes a station identifier subfield 454 that includes an identifier of the client station to which the HARQ user information subfield 450 corresponds. In an embodiment, the identifier of the client station is an association identifier (AID) as defined by the IEEE 802.11 Standard. In another embodiment, the identifier of the client station is a partial AID, e.g., a set of least significant bits of the AID. In another embodiment, the identifier of the client station is an index value that corresponds to an ordering of client stations specified in the MU SIG field (e.g., in an HE-SIG-B field). For example, the MU SIG field (e.g., the HE-SIG-B field) includes allocation information that allocates RUs to client stations, and the allocation information includes a listing of client stations in an order; the index corresponds to the order of the listing of client stations in the MU SIG field. Upon receiving the MU HARQ PPDU, a client station uses the station identifier subfield 454 to determine if the HARQ user information subfield 450 corresponds to the client station.

The HARQ user information subfield 450 also includes a number of HARQ PSDUs subfield 458, which indicates a number of HARQ PSDUs in the MU HARQ PPDU for the client station identified by the STA ID subfield 454 and which also indicates a number of HARQ PSDU information subfields 462 in the HARQ user information subfield 450.

The HARQ user information subfield 450 includes a respective HARQ PSDU information subfield 462 for each HARQ PSDU for the corresponding client station included in the MU HARQ PPDU, according to an embodiment. Each HARQ PSDU information subfield 462 includes information for the corresponding PSDU for the client station in the MU HARQ PPDU. In an embodiment, an ordering of the HARQ PSDU information subfields 462 corresponds to an ordering of the HARQ PSDUs in the MU HARQ PPDU. For example, a first occurring HARQ PSDU information subfield 462 corresponds to a first occurring HARQ PSDU for the client station, a second occurring HARQ PSDU information subfield 462 corresponds to a second occurring HARQ PSDU for the client station, and so on.

Figure 4C:
FIG. 4C is a diagram of an example HARQ PSDU information subfield included in the HARQ user information subfield of FIG. 4B, according to an embodiment.

FIG. 4C is a diagram of an example HARQ PSDU information subfield 470 that is included in HARQ user information subfield 450, according to an embodiment.

The HARQ PSDU information subfield 470 includes a duration subfield 474 that indicates a duration of the corresponding HARQ PSDU. The duration subfield 474 indicates a number of OFDM symbols in the corresponding HARQ PSDU, according to an embodiment. The duration subfield 474 indicates a time duration value for the corresponding HARQ PSDU, according to another embodiment. The duration subfield 474 consists of a suitable number, N, of bits. The total number of OFDM symbols in a HARQ PSDU will depend on an error correcting encoding rate that is used, a modulation scheme that is used, and a frequency bandwidth that is used. The MAC processor 126/166 is configured to ensure that an appropriate MAC layer data unit length is used for the error correcting encoding rate, the modulation scheme, and the frequency bandwidth so that the number of OFDM symbols in the HARQ PSDU can be represented by N bits.

The HARQ PSDU information subfield 470 also includes a pre-FEC padding factor subfield 478 that indicates a segment boundary in a last-occurring OFDM symbol of the corresponding coded HARQ PSDU, wherein padding bits are added prior to FEC encoding so that the FEC encoded bits end at the boundary in the OFDM symbol within the corresponding HARQ PSDU. In other embodiments, the pre-FEC padding factor subfield 478 is omitted from the HARQ PSDU information subfield 470.

The HARQ PSDU information subfield 470 also includes an LDPC extra symbol segment subfield 482 that indicates whether an extra OFDM symbol segment is present in a last-occurring OFDM symbol of the corresponding coded HARQ PSDU for pre-FEC padding when LDPC is used. In other embodiments, the LDPC extra symbol segment subfield 478 is omitted from the HARQ PSDU information subfield 470.

Figure 4D:
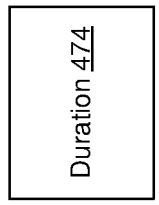
FIG. 4D is a diagram of another example HARQ PSDU information subfield included in the HARQ user information subfield of FIG. 4B, according to another embodiment.

FIG. 4D is a diagram of another example HARQ PSDU information subfield 490 that is included in the HARQ user information subfield 450, according to another embodiment.

The HARQ PSDU information subfield 490 includes the duration subfield 474 that indicates the duration of the corresponding HARQ PSDU, as discussed above with reference to FIG. 4C.

The HARQ PSDU information subfield 490 does not include a pre-FEC padding factor subfield. Rather, a same predetermined boundary is used for all HARQ PSDUs. In an embodiment, the same predetermined boundary corresponds to all segments of the last-occurring OFDM symbol of the coded HARQ PSDU so that pre-FEC padding results in the coded HARQ PSDU ending on an OFDM symbol boundary (e.g., for embodiments in which four segments are defined for an OFDM symbol, the same predetermined boundary corresponds to four segments).

The HARQ PSDU information subfield 490 does not include an LDPC extra symbol segment subfield. Rather, an extra OFDM symbol segment is always included in the last-occurring OFDM symbol for pre-FEC padding when LDPC is used for the PSDU.

Figure 5:
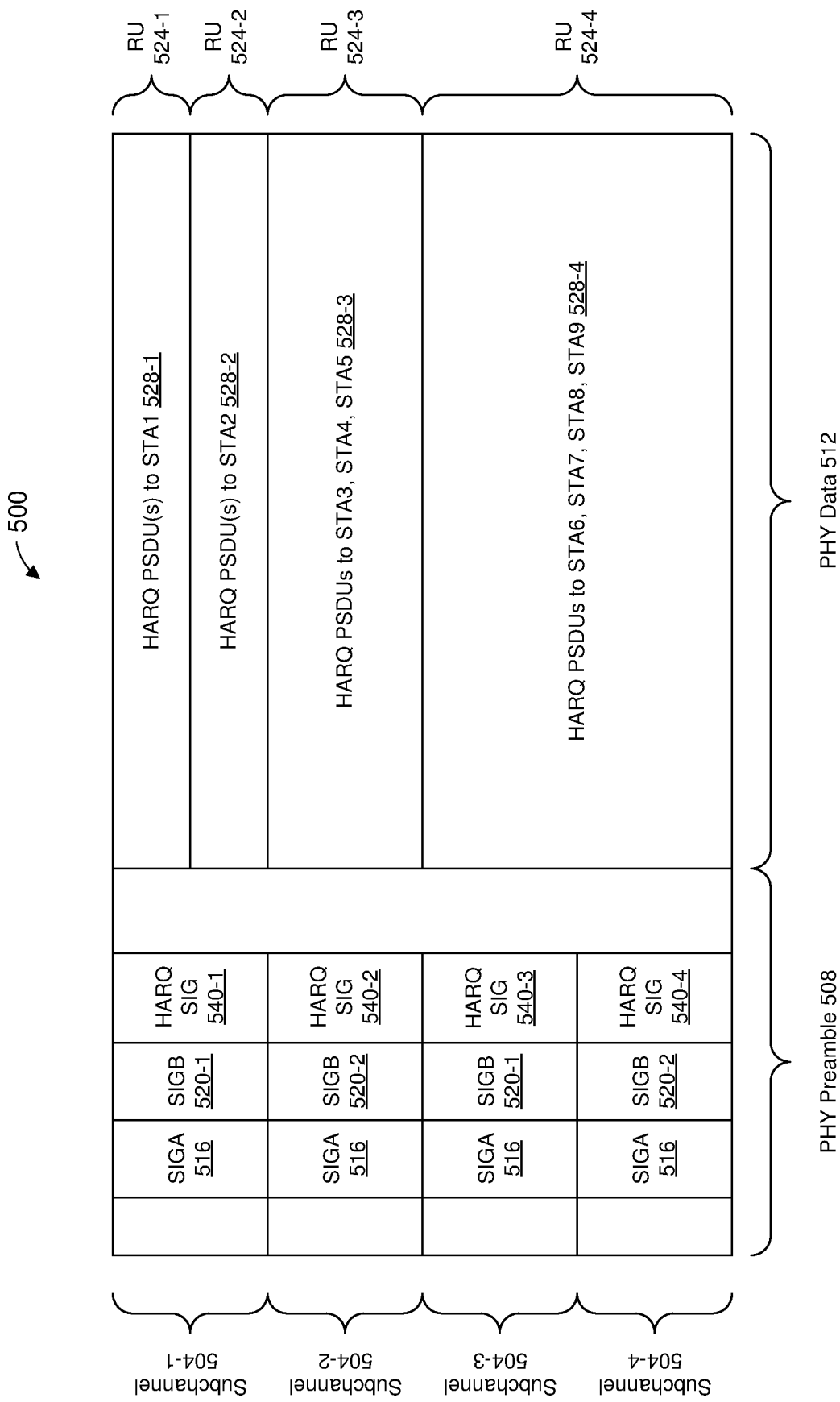
FIG. 5 is a diagram an example MY PHY data unit that includes individually encoded HARQ PHY PSDUs in a PHY data portion, and ii) a PHY preamble with HARQ signal fields, according to an embodiment.

FIG. 5 is a diagram of an example MU HARQ PPDU 500, according to an embodiment. In an embodiment, the network interface 122/162 is configured to generate the MU HARQ PPDU 500. In an embodiment, the PHY processor 130/170 is configured to generate the MU HARQ PPDU 500. In an embodiment, the HARQ PPDU generator 142/192 is configured to generate the MU HARQ PPDU 500.

In the example illustrated in FIG. 5, the MU HARQ PPDU 500 spans four frequency subchannels 504. In other scenarios, the MU HARQ PPDU 500 spans another suitable number of frequency subchannels 504, such as 1, 2, 8, 16, etc.

The MU HARQ PPDU 500 comprises a PHY preamble portion 508 and a PHY data portion 512. The PHY preamble portion 508 comprises a plurality of suitable training signals (not shown). Additionally, the PHY preamble portion 508 comprises a SIG field (SIGA field) 516. An instance of the SIGA field 516 is transmitted in each frequency subchannel 504, according to an embodiment. The SIGA field 516 corresponds to the SIG field 244 discussed above, according to an embodiment.

Additionally, the PHY preamble portion 508 comprises a SIG field (SIGB field) 520. The SIGB field 520 corresponds to the MU SIG field discussed above, according to an embodiment. In the example illustrated in FIG. 5, two versions of the SIGB field 520 are transmitted. In particular, SIGB field version 520-1 is transmitted in frequency subchannels 504-1 and 504-3, and SIGB field version 520-2 is transmitted in frequency subchannels 504-2 and 504-4. In other scenarios (e.g., in which the MU HARQ PPDU 500 spans another suitable number of frequency subchannels), different suitable numbers of versions of the SIGB field 520 are transmitted, such as 1, 4 etc.

The SIGB field 520 includes allocation information that indicates an allocation of frequency RUs 524. In an embodiment, each version of the SIGB field 520 includes allocation information for frequency RUs 524 that overall the frequency subchannels in which the version of the SIGB field 520 is transmitted. For instance, in the illustrative example of FIG. 5, SIGB field 520-1 includes allocation information for RU 524-1, RU 524-2, and RU 524-4, and SIGB field 520-2 includes allocation information for RU 524-3 and RU 524-4.

In the illustrative example of FIG. 5, RU 524-1 is allocated to a first client station (STA1); RU 524-2 is allocated to a second client station (STA2); RU 524-3 is allocated to three client stations (STA3, STA4, STA5) for an MU-MIMO transmission; and RU 524-4 is allocated to four client stations (STA6, STA7, STA8, STA9) for an MU-MIMO transmission. In the illustrative example of FIG. 5, allocation information in SIGB field 520-1 includes an ordering of client stations for RU 524-4, and allocation information in SIGB field 520-2 includes an ordering of client stations for RU 524-3.

The PHY data portion 512 includes a plurality of HARQ PSDUs 528 for multiple client stations. In the illustrative example of FIG. 5, one or more HARQ PSDUs 528-1 are transmitted to STA1 in RU 524-1; one or more HARQ PSDUs 528-2 are transmitted to STA2 in RU 524-2; a plurality of HARQ PSDUs 528-3 are transmitted to STA3, STA4, and STA5 in RU 524-3 using MU-MIMO; and a plurality of HARQ PSDUs 528-4 are transmitted to STA6, STA7, STA8, and STA9 in RU 524-4 using MU-MIMO.

The PHY preamble portion 508 comprises a plurality of HARQ SIG fields 540. In the example illustrated in FIG. 5, four HARQ SIG fields 540 are transmitted, each corresponding to a frequency subchannel 504. In particular, RU HARQ SIG field 540-1 is transmitted in frequency subchannel 504-1; RU HARQ SIG field 540-2 is transmitted in frequency subchannel 504-2; RU HARQ SIG field 540-3 is transmitted in frequency subchannel 504-3; and RU HARQ SIG field 540-4 is transmitted in frequency subchannel 504-4. In other scenarios (e.g., in which the MU HARQ PPDU 500 spans another suitable number of frequency subchannels 504), different suitable numbers of versions of the HARQ SIG field 540-1 are transmitted, such as 1, 2, 3, 5, 6, 7, 8, etc.

In an embodiment, each RU HARQ SIG field 540 includes HARQ-related information for HARQ PSDUs to be transmitted within the corresponding frequency subchannel 504, but does not include HARQ-related information for HARQ PSDUs to be transmitted within other frequency subchannels 504. For example, HARQ SIG field 540-1 includes HARQ-related information for HARQ PSDU(s) 528-1 and HARQ PSDU(s) 528-2; HARQ SIG field 540-2 includes HARQ-related information for HARQ PSDUs 528-3; and HARQ SIG field 540-3 and HARQ SIG field 540-4 include HARQ-related information for HARQ PSDUs 528-4 (for example, the HARQ-related information for HARQ PSDUs 528-4 is divided between HARQ SIG field 540-3 and HARQ SIG field 540-4).

In another embodiment, the same HARQ SIG field 540 is transmitted in each subchannel 504, and the HARQ SIG field 540 includes HARQ-related information for all HARQ PSDUs to be transmitted within the HARQ PPDU 500.

In the illustrative example of FIG. 5, the different HARQ SIG fields 540 may include different numbers of bits. Thus, padding (e.g., padding 424, FIG. 4A) may be added to one or more HARQ SIG fields 540 so that all of the HARQ SIG fields 540 span a same number of OFDM symbols. In an embodiment, the SIGA field 516 includes an indication of a number of OFDM symbols for the HARQ SIG fields 540, and padding (e.g., padding 424, FIG. 4A) is added to one or more HARQ SIG fields 540 so that all of the HARQ SIG fields 540 span the number of OFDM symbols indicated in the SIGA field 516.

Trigger-based PPDUs are transmitted in response to a trigger frame. For example, an AP transmits a trigger frame to prompt one or more client stations to transmit one or more trigger-based PPDUs. Transmission of a trigger-based PPDU begins a defined time period (e.g., a short interface space (SIFS) as defined by the IEEE 802.11 Standard, or another suitable time period) after receipt of an end of a PPDU that includes the trigger frame, in an embodiment.

Figure 6:
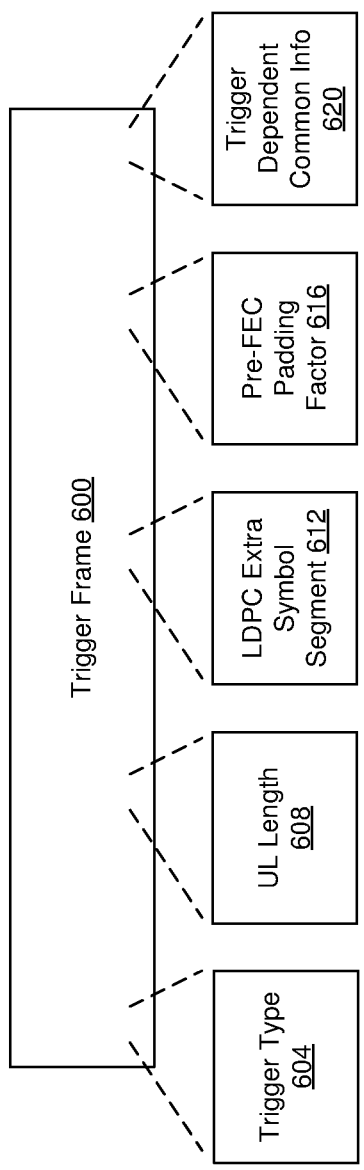
FIG. 6 is a diagram of an example trigger frame for triggering one or more communication devices to transmit one or more trigger-based PHY data units that include individually encoded HARQ PSDUs, according to an embodiment.

FIG. 6 is a diagram of an example trigger frame 600 that is configured to prompt one or more client stations to transmit one or more trigger-based HARQ PPDUs, according to an embodiment. In an embodiment, the trigger frame 600 is a MAC layer data unit (e.g., an MPDU). In an embodiment, the network interface 122/162 is configured to generate the trigger frame 600. In an embodiment, the MAC processor 126/166 is configured to generate the trigger frame 600.

The trigger frame 600 includes a trigger type field 604 that indicates a type of trigger frame from a plurality of different trigger types. For example, the current draft of the IEEE 802.11ax Standard defines eight different trigger types indicated by values 0-7 of a trigger type field, with values 8-15 reserved. In an embodiment, an additional trigger type is defined for a trigger frame that prompts one or more client stations to transmit one or more trigger-based HARQ PPDUs. In an illustrative embodiment, a value 8 of the trigger type field indicates that the trigger frame 600 is for prompting one or more client stations to transmit one or more trigger-based HARQ PPDUs. In other embodiments, another suitable value other than 8 is used, such as any of 9-15, or any other suitable value.

An uplink (UL) length field 608 indicates a duration of the trigger-based HARQ PPDU that is to be transmitted in response to the trigger frame 600. The AP 114 determines (e.g., the network interface 122 determines, the MAC processor 126 determines, etc.) the duration based on client station data buffer sizes known to the AP 114, the client station data buffer sizes indicating how much data each client station has to transmit to the AP 114. Since AP 114 has knowledge of the data buffer size of each client station, but the AP does not know a number of MPDUs each STA will include in the trigger-based HARQ PPDU, it is difficult for AP 114 to calculate an accurate UL length when each MPDU is individually encoded (as in a HARQ PPDU). In one embodiment, the AP 114 calculates (e.g., the network interface 122 calculates, the MAC processor 126 calculates, etc.) the UL length based on i) the data buffer sizes of the client stations and ii) any extra OFDM symbols when taking extra pre-FEC padding and post-FEC padding of each coded PSDU into account. In one embodiment, if a client station cannot fit all PSDUs into the trigger-based HARQ PPDU duration specified by the UL length field 608, the client station will aggregate as many PSDUs that can be included in the trigger-based HARQ PPDU, and then add padding to reach the duration specified by the UL length field 608. In another embodiment, if a client station cannot fit all PSDUs into the trigger-based HARQ PPDU duration specified by the UL length field 608, the client station fragments a last-occurring MPDU into two segments; the client station includes a first segment in the trigger-based HARQ PPDU, and includes a second segment in a subsequent HARQ PPDU.

An LDPC extra symbol segment subfield 612 indicates whether client station(s) should include an extra OFDM symbol segment for pre-FEC padding when LDPC is used for the trigger-based HARQ PPDU. In an embodiment, to facilitate symbol alignment among different STAs for the trigger-based HARQ PPDU (the AP does not have knowledge of number of MPDUs each client station will include in the trigger-based HARQ PPDU), the LDPC Extra Segment subfield 612 is set to one, according to an embodiment. In response to the LDPC Extra Segment subfield 612 being set to one, a client station receiving the trigger frame 600 will include an extra OFDM symbol segment in a last-occurring OFDM symbol of a last-occurring coded HARQ PSDU in the trigger-based HARQ PPDU, according to an embodiment.

A pre-FEC padding factor subfield 616 indicates to client station(s) a segment boundary in a last-occurring OFDM symbol of the trigger-based HARQ PPDU, wherein the client stations add padding bits prior to FEC encoding so that the FEC encoded bits end at the indicated segment boundary in the last-occurring OFDM symbol. In an embodiment, the pre-FEC padding factor subfield 616 is set to indicate that the segment boundary corresponds to an OFDM symbol boundary, according to an embodiment. In response to the pre-FEC padding factor subfield 616, a client station receiving the trigger frame 600 will add padding bits prior to FEC encoding so that the FEC encoded bits end at the indicated segment boundary in the last-occurring OFDM symbol, according to an embodiment.

In an embodiment, the trigger frame 600 includes a trigger dependent common information field 620 that is specific to trigger frames that are for prompting one or more client stations to transmit one or more trigger-based HARQ PPDUs. In an embodiment, the trigger dependent common information field 620 indicates a duration (e.g., represented as a number of OFDM symbols) of the trigger-based HARQ PPDU that is to be transmitted in response to the trigger frame 600. In an embodiment, the trigger dependent common information field 620 includes a subfield that specifies a number of OFDM symbols to be included in the trigger-based HARQ PPDU that is to be transmitted in response to the trigger frame 600.

In an embodiment, the trigger frame 600 includes allocation information that indicates which client station(s) are to transmit trigger-based HARQ PPDUs in response to the trigger frame 600. In an embodiment, the allocation information also indicates the RUs assigned to the client station(s) for the trigger-based HARQ PPDUs.

In an embodiment, only one client station is assigned to each RU. In another embodiment, multiple client stations are permitted to be assigned to a single RU.

Figure 7:
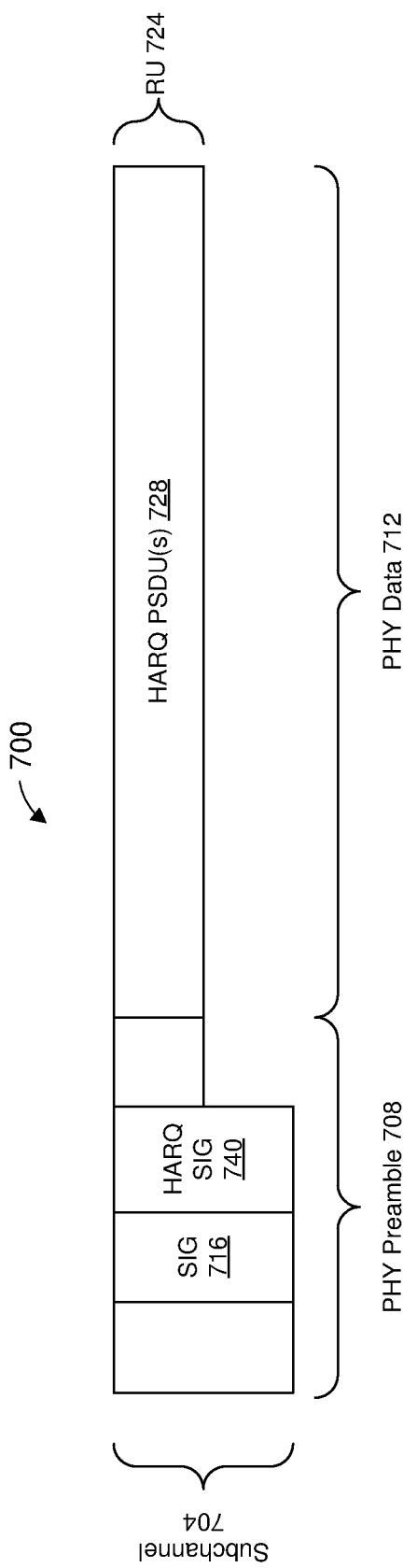
FIG. 7 is a diagram of an example trigger-based PHY data unit that includes individually encoded HARQ PSDUs, according to an embodiment.

FIG. 7 is a diagram of an example trigger-based HARQ PPDU 700 transmitted by a client station. In an embodiment, the trigger-based HARQ PPDU 700 is transmitted in response to the trigger frame 600 of FIG. 6. In another embodiment, the trigger-based HARQ PPDU 700 is transmitted in response to another trigger frame that indicates a trigger-based HARQ PPDU is to be transmitted.

In an embodiment, the network interface 122/162 is configured to generate the trigger-based HARQ PPDU 700. In an embodiment, the PHY processor 130/170 is configured to generate the trigger-based HARQ PPDU 700. In an embodiment, the HARQ PPDU generator 142/192 is configured to generate the trigger-based HARQ PPDU 700.

As discussed above, a trigger frame indicates the RU(s) via which the trigger-based HARQ PPDU 700 is to be transmitted. In the example illustrated in FIG. 7, the trigger-based HARQ PPDU 700 is included in one frequency subchannel 704. In other scenarios, the trigger-based HARQ PPDU 700 is included within another suitable number of frequency subchannels 504, such as 2, 4, 8, 16, etc.

The trigger-based HARQ PPDU 700 comprises a PHY preamble portion 708 and a PHY data portion 712. The PHY preamble portion 708 comprises a plurality of suitable training signals (not shown). Additionally, the PHY preamble portion 708 comprises a SIG field 716. An instance of the SIG field 716 is transmitted in each frequency subchannel 704 in which the trigger-based HARQ PPDU 700 is included, according to an embodiment. In an embodiment, the SIG field 716 indicates whether the PPDU 700 includes a HARQ SIG field. In another embodiment, the SIG field 716 does not indicates whether the PPDU 700 includes a HARQ SIG field. For example, because the trigger-based HARQ PPDU 700 is transmitted in response to a trigger frame that instructs the client station to transmit a trigger-based HARQ PPDU, the AP knows that the PPDU 700 includes a HARQ SIG field.

In the illustrative example of FIG. 7, the trigger frame specified that the client station is to utilize the RU 724. Thus, the PHY data portion 712 includes one or more HARQ PSDUs 728 transmitted within the RU 724.

The PHY preamble portion 708 also comprises a HARQ SIG field 740. In an embodiment, the HARQ SIG field 740 is transmitted within the frequency subchannel 704. In an embodiment, a duration of the HARQ SIG field 740 corresponds to a duration indicated in the trigger frame that prompts transmission of the trigger-based HARQ PPDU 700, and the SIG field 716 does not indicate a duration of the HARQ SIG field 740. In another embodiment, the SIG field 716 indicates a duration of the HARQ SIG field 740 such as the SIG field 244 described above.

In an embodiment, the HARQ SIG field 740 has a format similar to the HARQ SIG field 300 discussed with reference to FIGS. 3A and 3B, except that the HARQ SIG field 740 does not include a PE disambiguity subfield and a last-occurring HARQ PSDU information subfield 312-$n$ does not include a pre-FEC padding factor subfield 358 and does not include an LDPC extra symbol segment subfield 362. For example, in an embodiment in which the trigger frame instructs the client station regarding a pre-FEC padding factor and an LDPC extra OFDM symbol segment (e.g., as discussed above with reference to FIG. 6), the AP knows the pre-FEC padding factor for the last-occurring HARQ PSDU in the trigger based HARQ PPDU 700 and whether the last-occurring HARQ PSDU includes an extra OFDM symbol segment in a last-occurring OFDM symbol in the last-occurring coded HARQ PSDU.

In an embodiment, the HARQ SIG field 740 has a format similar to the HARQ SIG field 300 discussed with reference to FIGS. 3A and 3C, except that the HARQ SIG field 740 does not include a PE disambiguity subfield.

Figure 8:
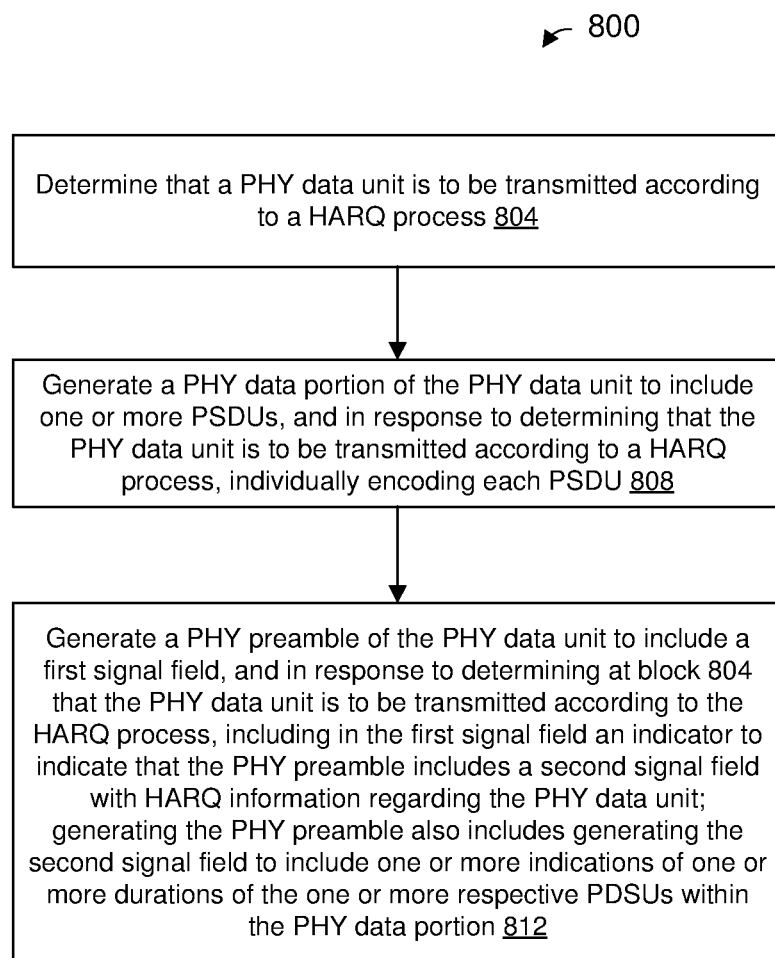
FIG. 8 is a flow diagram of an example method for generating a PHY data unit that includes i) a plurality of individually encoded HARQ PSDUs in a PHY data portion, and ii) a PHY preamble with a HARQ signal field, according to another embodiment.

FIG. 8 is a flow diagram of an example method 800 for generating a HARQ PPDU, according to an embodiment. The method 800 involves generating a HARQ PPDU such as described above with reference to FIGS. 2, 3A-C, 4A-D, and 5-7, according to various embodiments.

In some embodiments, the network interface 122/162 is configured to implement the method 800. In some embodiments, the PHY processor 130/170 is configured to implement at least a portion of the method 800. In an embodiment, the HARQ PPDU generator 142/192 is configured to implement at least a portion of the method 800.

At block 804, a communication device determines (e.g., the network interface 122/162 determines, the MAC processor determines 126/166 determines, the PHY processor 130/170 determines, etc.) that a PHY data unit is to be transmitted according to a HARQ process. For example, the communication device performs a negotiation with another communication and agrees that the communication device is to transmit a HARQ PPDU to the other communication device based on the negotiation, according to an embodiment. As another example, the communication device receives a trigger frame from another communication where the trigger frame instructs the communication device to transmit trigger-based HARQ PPDU, according to another embodiment.

At block 808, the communication device generates (e.g., the network interface 122/162 generates, the PHY processor 130/170 generates, the HARQ PPDU generator 142/192 generates, etc.) a PHY data portion of the PHY data unit. In an embodiment, generating the PHY data portion at block 808 includes generating one or more PSDUs. In another embodiment, generating the PHY data portion at block 808 includes generating a plurality of PSDUs.

Generating the PHY data portion at block 808 also includes, in response to determining at block 804 that the PHY data unit is to be transmitted according to the HARQ process, individually encoding each PSDU generated at block 808.

In an embodiment, individually encoding each PSDU at block 808 comprises individually encoding each PSDU with a BCC encoder. In another embodiment, individually encoding each PSDU at block 808 comprises individually encoding each PSDU with an LDPC encoder.

At block 812, the communication device generates (e.g., the network interface 122/162 generates, the PHY processor 130/170 generates, the HARQ PPDU generator 142/192 generates, etc.) a PHY preamble of the PHY data unit. Generating the PHY preamble at block 812 includes generating a first signal field in the PHY preamble, and in response to determining at block 804 that the PHY data unit is to be transmitted according to the HARQ process, including in the first signal field an indicator to indicate that the PHY preamble includes a second signal field with HARQ information regarding the PHY data unit. Generating the PHY preamble at block 812 also includes generating the second signal field to include one or more indications of one or more durations of the one or more respective PSDUs within the PHY data portion. In an embodiment, the second signal field is separate from the first signal field.

In an embodiment, the first signal field is the SIG field 244 and the second signal field is the HARQ SIG field 248 described above. In another embodiment, the first signal field is the SIG field 516 and the second signal field is the HARQ SIG field 540 described above. In another embodiment, the first signal field is the SIG field 716 and the second signal field is the HARQ SIG field 740 described above. In other embodiments, the first signal field and the second signal field are other suitable signal fields.

In another embodiment, generating the second signal field at block 812 comprises generating a respective PSDU information subfield for each of the one or more PSDUs, wherein each PSDU information subfield includes a respective indication of a respective duration of the respective PSDU.

In another embodiment, generating the respective PSDU information subfield for each of the one or more PSDUs comprises including in the respective PSDU information subfield padding information corresponding to the respective PSDU.

In another embodiment, generating the respective PSDU information subfield for each of the one or more PSDUs further comprises including in the respective PSDU information subfield an indicator of whether an extra OFDM symbol segment was included for a last-occurring OFDM symbol of the respective coded PSDU in connection with LDPC encoding of information in the respective PSDU.

In another embodiment, the PHY data unit is an MU PHY data unit to be transmitted to a plurality of other communication devices; generating the PHY preamble at block 812 further comprises generating a third signal field that includes allocation information that allocates multiple frequency RUs among the multiple other communication devices; and generating the second signal field comprises generating a respective HARQ user information subfield for one or more respective other communication devices, wherein each HARQ user information subfield includes a PSDU information subfield for each of one or more PSDUs for the respective other communication device, wherein each PSDU information subfield includes a respective indication of a respective duration of the respective PSDU.

In another embodiment, each HARQ user information subfield is generated to include a station identifier of the respective other communication device.

In another embodiment, the second signal field is generated to be transmitted within only a first frequency subchannel; the second signal field includes HARQ information only for PSDUs to be transmitted in one or more RUs that overlap with the first frequency subchannel; generating the PHY preamble at block 812 further comprises generating one or more other second signal fields corresponding to one or more respective second frequency subchannels, wherein each of the one or more other second signal fields are generated to include HARQ information only for PSDUs to be transmitted within one or more respective RUs that overlap with the respective second frequency subchannel.

Figure 9:
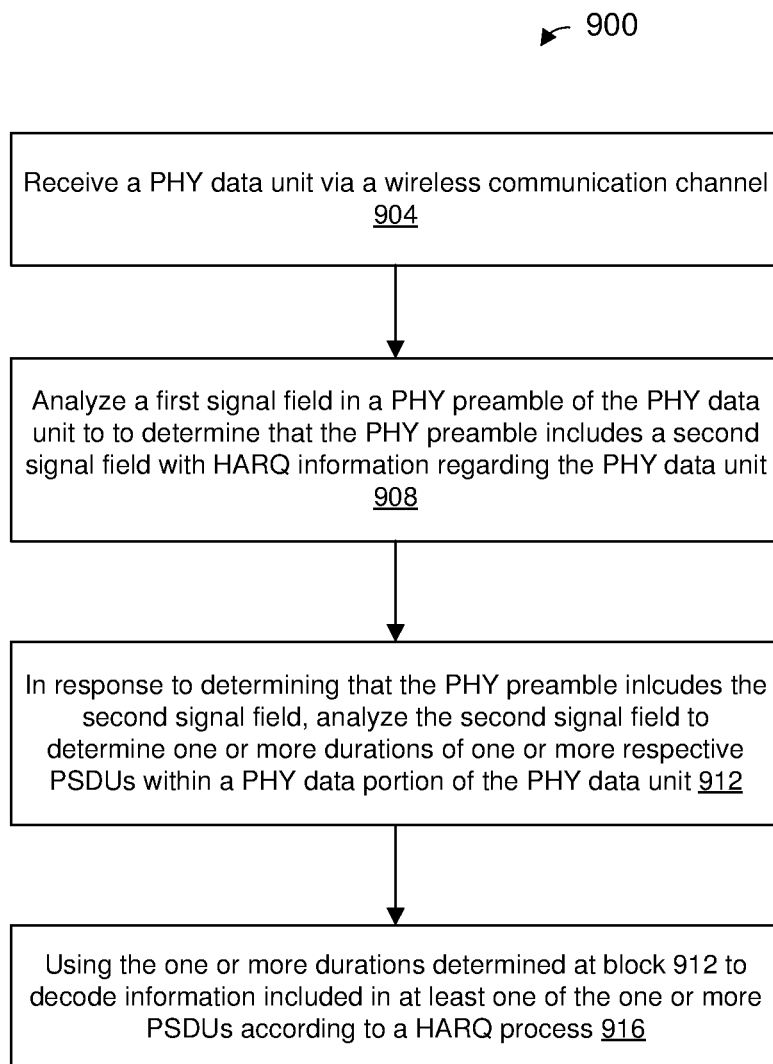
FIG. 9 is a flow diagram of an example method for processing a PHY data unit that includes i) a plurality of individually encoded HARQ PSDUs in a PHY data portion, and ii) a PHY preamble with a HARQ signal field, according to another embodiment.

FIG. 9 is a flow diagram of an example method 900 for processing a HARQ PPDU received in a WLAN, according to an embodiment. The method 900 involves processing a HARQ PPDU such as described above with reference to FIGS. 2, 3A-C, 4A-D, 5, 6, and 8, according to various embodiments.

In some embodiments, the network interface 122/162 is configured to implement the method 900. In some embodiments, the PHY processor 130/170 is configured to implement at least a portion of the method 900. In an embodiment, the HARQ decoder 146/196 is configured to implement at least a portion of the method 900.

At block 904, a communication device receives (e.g., the network interface 122/162 receives, the PHY processor 130/170 receives, etc.) a PHY data unit via a wireless communication channel.

At block 908, the communication device analyzes a first signal field in a PHY preamble of the PHY data unit to determine that the PHY preamble includes a second signal field with HARQ information regarding the PHY data unit. In an embodiment, the first signal field is the SIG field 244 and the second signal field is the HARQ SIG field 248 described above. In another embodiment, the first signal field is the SIG field 516 and the second signal field is the HARQ SIG field 540 described above. In another embodiment, the first signal field is the SIG field 716 and the second signal field is the HARQ SIG field 740 described above.

At block 912, in response to determining at block 908 that the PHY preamble includes the second signal field, the communication device analyzes the second signal field to determine one or more durations of one or more respective PSDUs within a PHY data portion of the PHY data unit.

At block 916, the communication device uses the one or more durations determined at block 912 to decode information included in at least one of the one or more PSDUs according to a HARQ process.

In an embodiment, block 916 includes using the one or more durations determined at block 912 to determine boundaries between PSDUs in the PHY data unit.

In an embodiment, block 916 includes soft combining information in a PSDU in the PHY data unit with information in another transmission of the PSDU in another PHY data unit.

In an embodiment, the second signal field includes one or more subfields that indicate one or more respective numbers of OFDM symbols in the respective one or more PSDUs, and block 916 includes using the one or more respective numbers of OFDM symbols to decode information included in at least one of the one or more PSDUs according to a HARQ process.

In an embodiment, the PHY data unit is an MU PHY data unit transmitted to the communication device and one or more other communication devices; the one or more PSDUs are for the communication device; the MU PHY data unit includes one or more other PSDUs for the one or more other communication devices; and the method 900 further comprises the communication device analyzing a third signal field in the PHY preamble of the PHY data unit to determine a frequency resource unit allocated to the communication device for the MU PHY data unit. In an embodiment, the second signal field includes a HARQ user information field that comprises i) a station identifier subfield and ii) one or more PSDU information fields corresponding to the one or more PSDUs for the communication device; and the method 900 further comprises: the communication device analyzing the station identifier subfield in the HARQ user information field to determine that the HARQ user information field corresponds to the communication device, and in response to determining that the HARQ user information field corresponds to the communication device, the communication device analyzing the one or more PSDU information fields in the HARQ user information field to determine that the one or more durations of the one or more respective PSDUs for the communication device.

Figure 10:
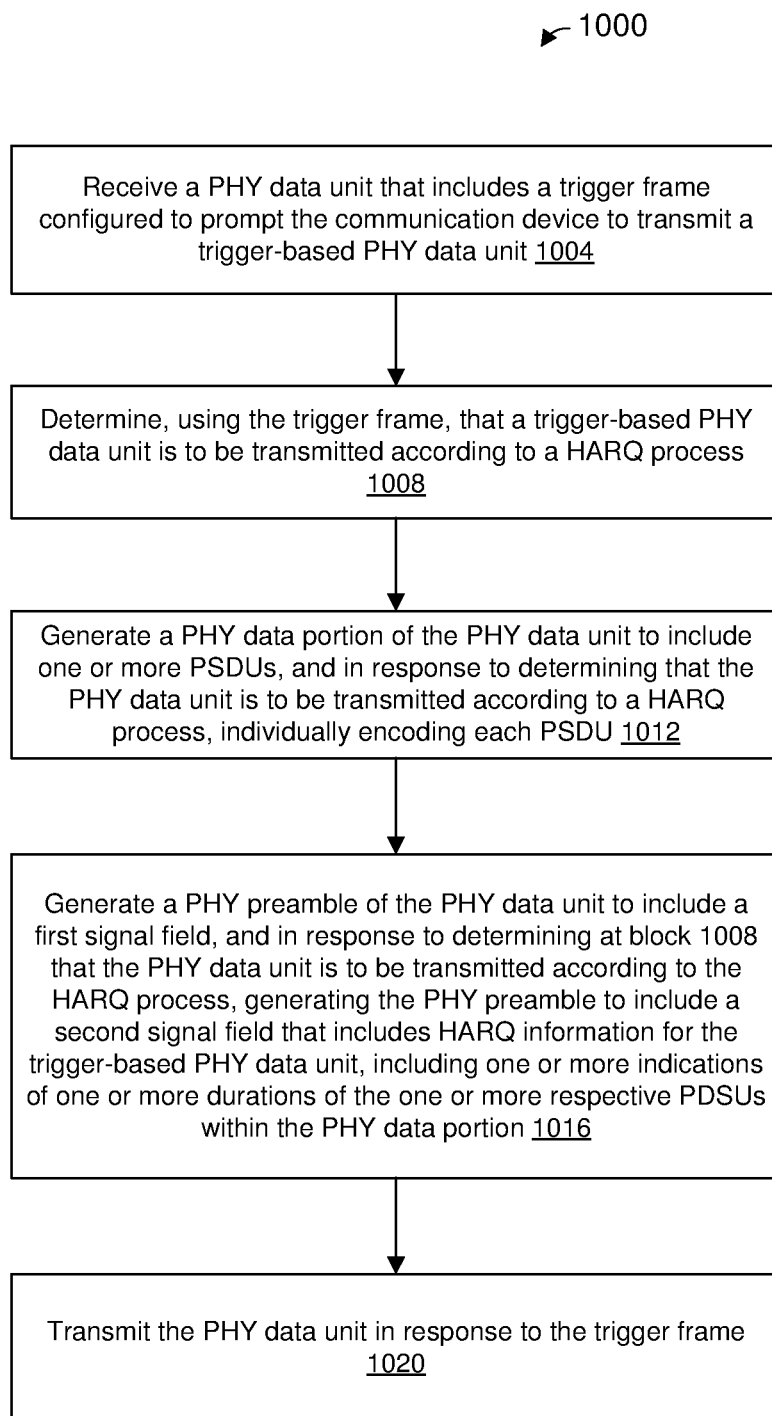
FIG. 10 is a flow diagram of an example method for generating and transmitting a trigger-based PHY data unit that includes a plurality of individually encoded HARQ PSDUs in a PHY data portion, according to another embodiment.

FIG. 10 is a flow diagram of an example method 1000 for transmitting a HARQ trigger-based PPDU, according to an embodiment. The method 1000 involves generating a trigger-based HARQ PPDU such as described above with reference to FIGS. 6 and 7, according to various embodiments.

In some embodiments, the network interface 122/162 is configured to implement the method 1000. In some embodiments, the PHY processor 130/170 is configured to implement at least a portion of the method 1000. In an embodiment, the HARQ PPDU generator 142/192 is configured to implement at least a portion of the method 1000.

At block 1004, a communication device receives (e.g., the network interface 122/162 receives, the PHY processor 130/170 receives, etc.) a PHY data unit that includes a trigger frame. According to an embodiment, the trigger frame has a format such as described above with reference to FIG. 6. In other embodiments, the trigger frame has another suitable format. The trigger frame is configured to prompt the communication device to transmit a trigger-based PHY data unit a defined time period (e.g., SIFS as defined by the IEEE 802.11 Standard or another suitable time period) after an end of the PHY data unit received at block 1004.

At block 1008, the communication device determines (e.g., the network interface 122/162 determines, the MAC processor determines 126/166 determines, the PHY processor 130/170 determines, etc.) that the communication device is to transmit a trigger-based PHY data unit according to a HARQ process in response to receiving the trigger frame at block 1004. For example, the trigger frame includes a trigger type field and a value of the trigger type field indicates that a trigger-based HARQ PPDU is to be transmitted in response to the trigger frame, according to an embodiment. Additionally, the trigger frame includes RU allocation information that specifies an RU has been allocated to the communication device, according to an embodiment.

At block 1012, the communication device generates (e.g., the network interface 122/162 generates, the PHY processor 130/170 generates, the HARQ PPDU generator 142/192 generates, etc.) a PHY data portion of the PHY data unit. In an embodiment, generating the PHY data portion at block 1012 includes generating one or more PSDUs. In another embodiment, generating the PHY data portion at block 1012 includes generating a plurality of PSDUs.

Generating the PHY data portion at block 1012 also includes, in response to determining at block 1008 that the trigger-based PHY data unit is to be transmitted according to the HARQ process, individually encoding each PSDU generated at block 1012.

In an embodiment, individually encoding each PSDU at block 1012 comprises individually encoding each PSDU with a BCC encoder. In another embodiment, individually encoding each PSDU at block 1012 comprises individually encoding each PSDU with an LDPC encoder.

At block 1016, the communication device generates (e.g., the network interface 122/162 generates, the PHY processor 130/170 generates, the HARQ PPDU generator 142/192 generates, etc.) a PHY preamble of the PHY data unit. Generating the PHY preamble at block 1016 includes generating a first signal field in the PHY preamble. Generating the PHY preamble at block 1016 also includes, in response to determining at block 1008 that the trigger-based PHY data unit is to be transmitted according to the HARQ process, generating a second signal field to include HARQ information for the one or more respective PSDUs within the PHY data portion, including one or more indications of one or more durations of the one or more respective PSDUs within the PHY data portion. In an embodiment, the second signal field is separate from the first signal field.

In an embodiment, the first signal field is the SIG field 716 and the second signal field is the HARQ SIG field 740 described above.

In another embodiment, generating the second signal field at block 1016 comprises generating a respective PSDU information subfield for each of the one or more PSDUs, wherein each PSDU information subfield includes a respective indication of a respective duration of the respective PSDU.

In another embodiment, generating the respective PSDU information subfield for each of the one or more PSDUs comprises including in the respective PSDU information subfield padding information corresponding to the respective PSDU.

In another embodiment, generating the respective PSDU information subfield for each of the one or more PSDUs further comprises including in the respective PSDU information subfield an indicator of whether an extra OFDM symbol segment was included for a last-occurring OFDM symbol of the respective coded PSDU in connection with LDPC encoding of information in the respective PSDU.

At block 1020, the communication device transmits (e.g., the network interface 122/162 transmits, the PHY processor 130/170 transmits, etc.) the trigger-based PHY data unit in response to receiving the trigger frame at block 1004. In an embodiment, the communication device begins transmitting the trigger-based PHY data unit a defined time period (e.g., SIFS as defined by the IEEE 802.11 Standard or another suitable time period) after an end of the PHY data unit received at block 1004.

In an embodiment, the second signal field is generated to be transmitted within a frequency subchannel that includes an RU allocated to the communication device as indicated in the trigger frame; the second signal field includes HARQ information for PSDUs to be transmitted in the RU; and transmitting the PHY data unit at block 1020 includes transmitting the second signal field in the frequency subchannel that includes the RU, and transmitting the PHY data portion in the RU.

Figure 11:
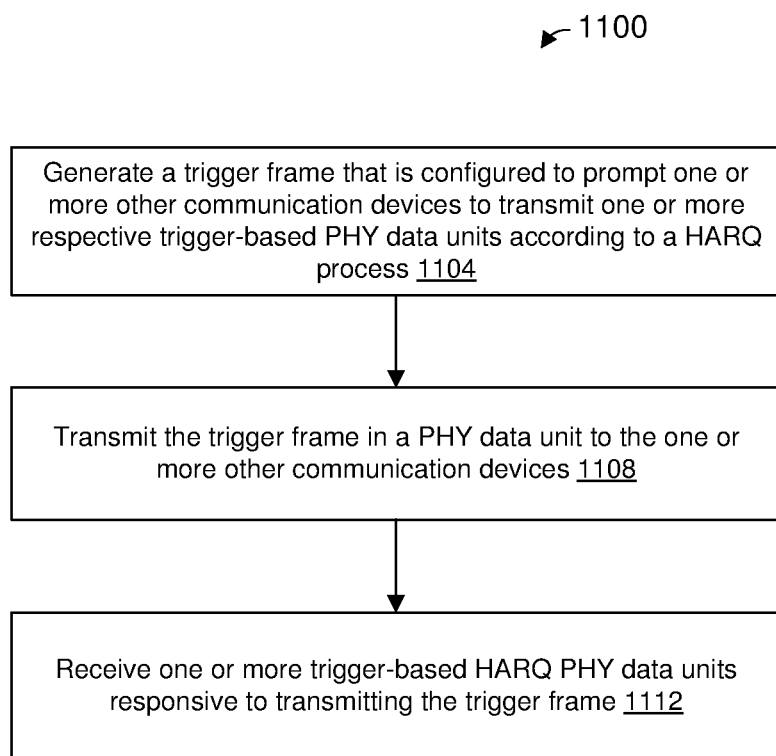
FIG. 11 is a flow diagram of an example method for prompting one or more communication devices to transmit one or more respective trigger-based PHY data units that include individually encoded HARQ PSDUs, according to another embodiment.

FIG. 11 is a flow diagram of an example method 1100 for prompting transmission of one or more HARQ trigger-based PPDUs, according to an embodiment. The method 1100 involves generating and transmitting a trigger frame and receiving one or more HARQ trigger-based PPDUs such as described above with reference to FIGS. 6 and 7, according to various embodiments.

In some embodiments, the network interface 122/162 is configured to implement the method 1100. In some embodiments, the PHY processor 130/170 is configured to implement at least a portion of the method 1100.

At block 1104, a communication device generates (e.g., the network interface 122/162 generates, the MAC processor 126/166 generates, etc.) a trigger frame that is configured to prompt one or more other communication devices to transmit one or more respective trigger-based PHY data units a defined time period (e.g., SIFS as defined by the IEEE 802.11 Standard or another suitable time period) after an end of a PHY data unit that includes the trigger frame. According to an embodiment, the trigger frame has a format such as described above with reference to FIG. 6. In other embodiments, the trigger frame has another suitable format.

At block 1108, the communication device transmits (e.g., the network interface 122/162 transmits, the PHY processor 130/170 transmits, etc.) a PHY data unit that includes the trigger frame generated at block 1104.

At block 1008, the communication device determines (e.g., the network interface 122/162 determines, the MAC processor determines 126/166 determines, the PHY processor 130/170 determines, etc.) that the communication device is to transmit a trigger-based PHY data unit according to a HARQ process in response to receiving the trigger frame at block 1004. For example, the trigger frame includes a trigger type field and a value of the trigger type field indicates that a trigger-based HARQ PPDU is to be transmitted in response to the trigger frame, according to an embodiment. Additionally, the trigger frame includes RU allocation information that specifies an RU has been allocated to the communication device, according to an embodiment.

At block 1112, the communication device receives (e.g., the network interface 122/162 receives, the PHY processor 130/170 receives, etc.) one or more trigger-based PHY data units responsive to transmitting the trigger frame at block 1108. In an embodiment, the one or more trigger-based PHY data units are trigger-based HARQ PPDUs having a format as described with reference to FIGS. 6 and 7. In another embodiment, the one or more trigger-based PHY data units have another suitable format and include PSDUs encoded according to the HARQ process.

Figure 12:
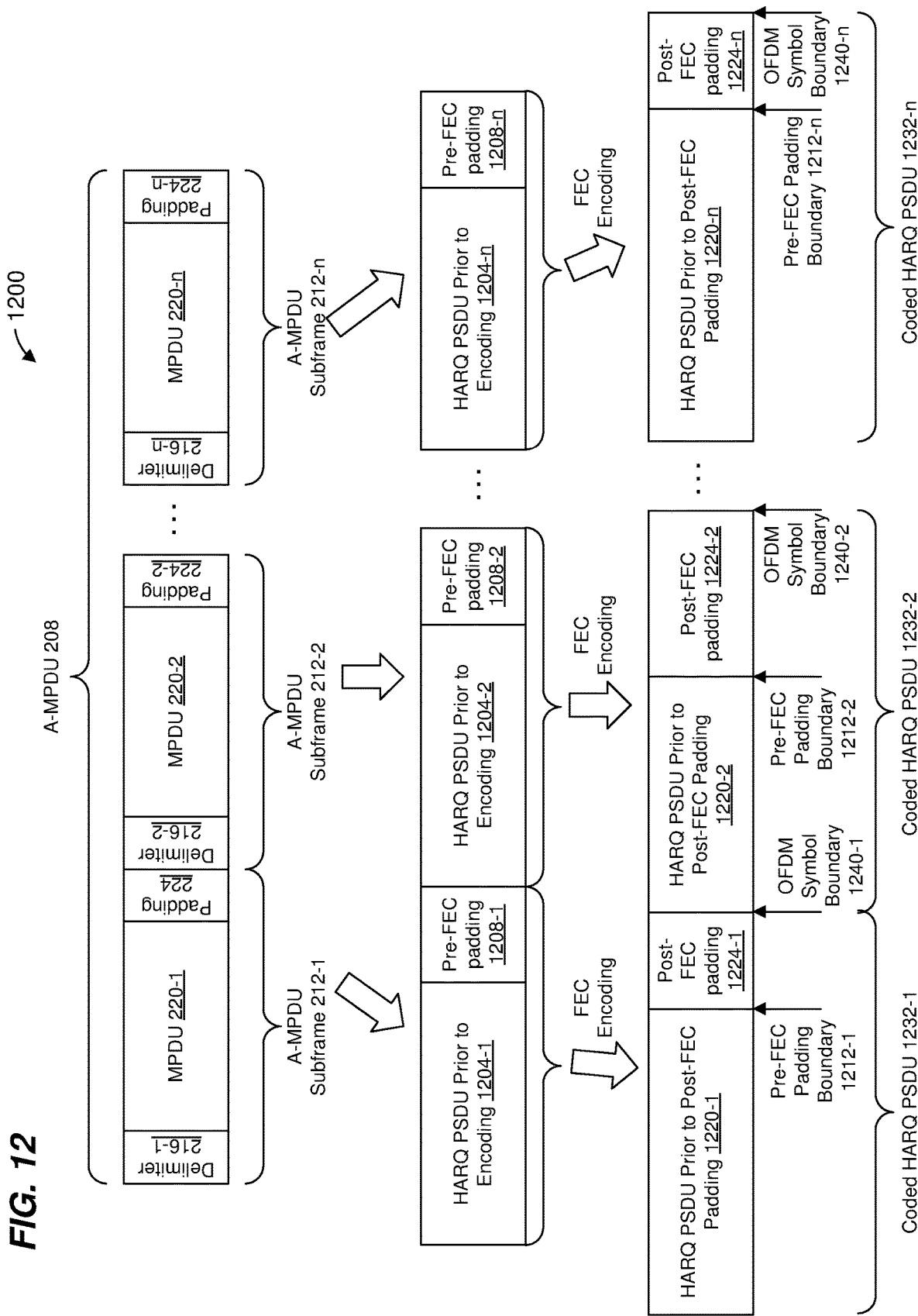
FIG. 12 is a diagram an example process for individually encoding PSDUs to be included in a PHY data unit, according to an embodiment.

FIG. 12 is a diagram an example process 1200 for individually encoding PSDUs to be included in a HARQ PPDU, according to an embodiment. The network interface 122/162 is configured to perform the process 1200, according to an embodiment. The PHY processor 126/166 is configured to perform the process 1200, according to an embodiment. The HARQ PPDU generator 142/192 is configured to perform the process 1200, according to an embodiment. In other embodiments, another suitable WLAN network interface performs the process 1200.

In various embodiments, the process 1200 is used with any of the HARQ PPDUs such as described above with reference to FIGS. 2, 3A-C, 4A-D, and 5-7, or another suitable HARQ PPDU. In various embodiments, the process 1200 is used with any of the methods describe with reference to FIGS. 8-11, or any other suitable method.

The A-MPDU 208 is the same as the A-MPDU 208 discussed with reference to FIG. 2 and is not discussed in detail again for purpose of brevity. Each A-MPDU subframe 212 corresponds to respective PSDU 1204 prior to FEC encoding and prior to pre-FEC padding.

As illustrated in FIG. 12, pre-FEC padding bits 1208 are added to each PSDU prior to FEC encoding. In an embodiment, for each PSDU a corresponding pre-FEC padding boundary 1212 within a last-occurring OFDM symbol for the PSDU is selected, and an amount of pre-FEC padding bits 1208 is determined so that, after the PSDU 1204 and the pre-FEC padding bits 1208 are FEC encoded, an encoded PSDU 1220 will end at the corresponding pre-FEC padding boundary 1212. In various embodiments, FEC encoding comprises BCC encoding, LDPC encoding, or some other suitable FEC encoding.

In some embodiments, determining an amount of pre-FEC padding bits includes determining whether an extra OFDM symbol segment is to be added to a last-occurring OFDM symbol of the coded HARQ PSDU when LDPC encoding is used, and indicating in a corresponding LDPC extra symbol segment subfield in the HARQ SIG field whether the extra OFDM symbol segment is added in the last-occurring OFDM symbol, as discussed above.

After the PSDU 1204 and the pre-FEC padding bits 1208 are FEC encoded, post-FEC padding bits 1224 are added to each PSDU 1220 so that a coded HARQ PSDU 1232 ends at an OFDM symbol boundary 1240.

In various embodiments, an indication of the selected pre-FEC padding boundary 1212 for each coded HARQ PSDU 1232 is indicated in a corresponding pre-FEC padding factor subfield in the HARQ SIG field, as discussed above.

In the process 1200 illustrated in FIG. 12, each coded HARQ PSDU 1232 begins at an OFDM symbol boundary and ends at an OFDM symbol boundary, which simplifies a process at the receiver for determining boundaries between PSDUs in an HARQ PPDU. On the other hand, the process 1200 increases an amount of padding bits added, which reduces data throughput.

Figure 13:
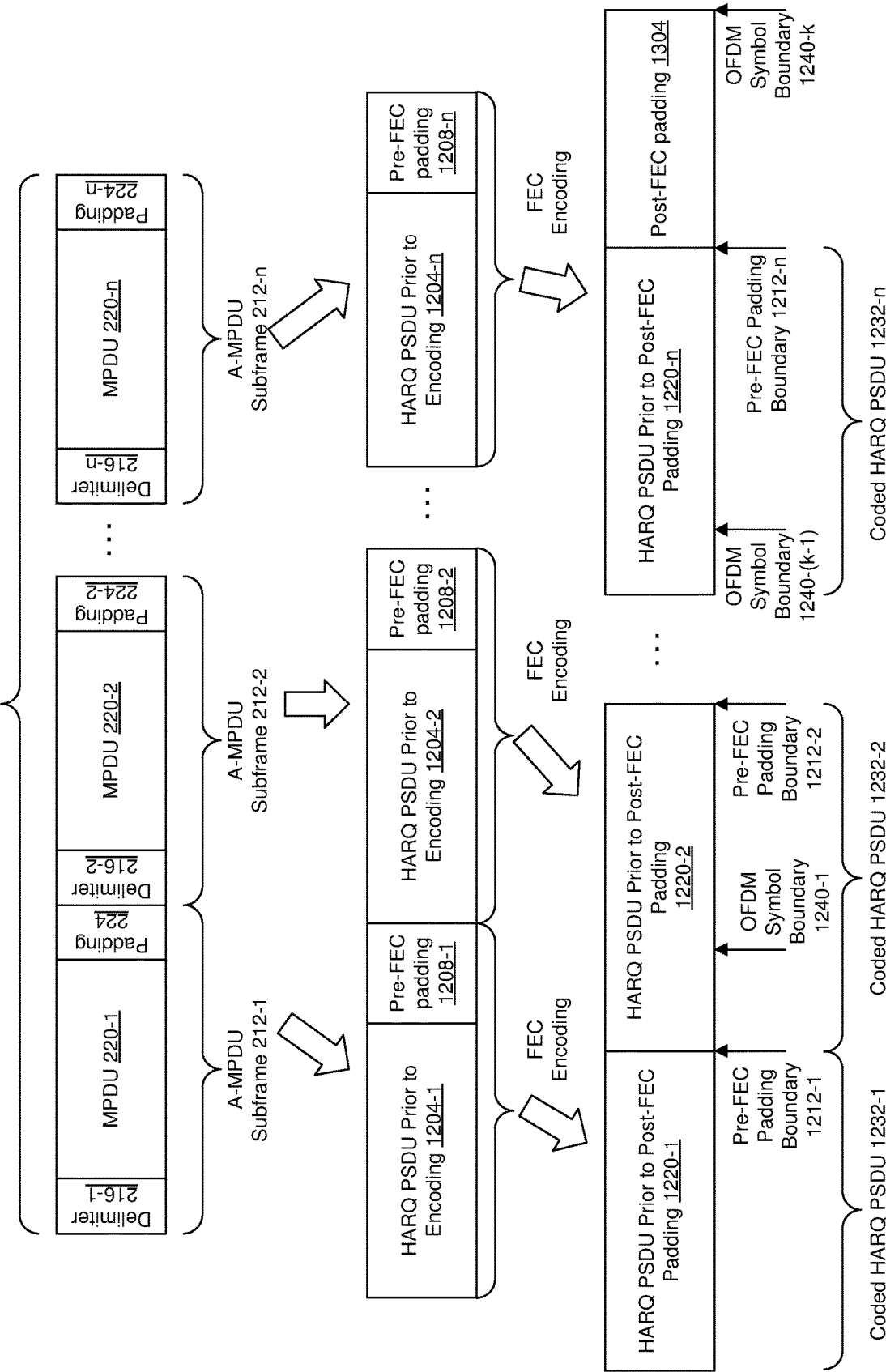
FIG. 13 is a diagram another example process for individually encoding PSDUs to be included in a PHY data unit, according to another embodiment.

FIG. 13 is a diagram of another example process 1300 for individually encoding PSDUs to be included in a HARQ PPDU, according to an embodiment. The network interface 122/162 is configured to perform the process 1300, according to an embodiment. The PHY processor 126/166 is configured to perform the process 1300, according to an embodiment. The HARQ PPDU generator 142/192 is configured to perform the process 1300, according to an embodiment. In other embodiments, another suitable WLAN network interface performs the process 1300.

In various embodiments, the process 1300 is used with any of the HARQ PPDUs such as described above with reference to FIGS. 2, 3A-C, 4A-D, and 5-7, or another suitable HARQ PPDU. In various embodiments, the process 1300 is used with any of the methods describe with reference to FIGS. 8-11, or any other suitable method.

The process 1300 is similar to the process 1200, and elements with the same reference numbers are not described in detail for purposes of brevity.

In the process 1300, after FEC encoding post-FEC padding bits are not added to each PSDU 1220 to reduce a total amount of padding in the HARQ PPDU as compared to the process 1200 of FIG. 12. Rather, post-FEC padding bits 1304 are added after a last-occurring coded HARQ PSDU 1232 so that the HARQ PPDU ends at an OFDM symbol boundary. Thus, each encoded PSDU 1220 does not necessarily end at an OFDM symbol boundary. As a result, determination at the receiver of boundaries between coded HARQ PSDUs 1232 is more complex as compared to the process 1200 of FIG. 12.

In embodiments discussed above, a single MPDU (or a single A-MPDU subframe) is included in each HARQ PSDU. In some instances, some MPDUs may have a small size as compared to typical MPDUs such that individually encoding such MPDUs is inefficient and may degrade performance. For example, an amount of pre-FEC padding and/or an amount of post-FEC padding may be relatively large as compared to a size of the MPDU. As another example, a performance of an LDPC code may be worse for shorter MPDUs as compared to relatively longer MPDUs. Thus, in some embodiments, multiple small-sized MPDUs (and/or multiple small-sized A-MPDU subframes) are combined into a single HARQ PSDU. The network interface 122/162 is configured to (e.g., the PHY processor 126/166 is configured to, the HARQ PPDU generator 142/192 is configured to, etc.) determine whether to jointly encode multiple MPDUs (or A-MPDU subframes) based on respective sizes of the multiple MPDUs (or A-MPDU subframes), according to some embodiments.

In various embodiments in connection with any of the HARQ PPDUs such as described above with reference to FIGS. 2, 3A-C, 4A-D, and 5-7, or another suitable HARQ PPDU, and/or in connection with any of the methods/processes described above with reference to FIGS. 8-13, a communication device optionally determines whether to jointly encode multiple MPDUs (or A-MPDU subframes) based on respective sizes of the multiple MPDUs (or A-MPDU subframes); and in response to determining that multiple MPDUs (or A-MPDU subframes) are to be jointly encode, the communication device combines the multiple jointly encoded MPDUs (and/or A-MPDU subframes) into a single HARQ PSDU.

Figure 14:
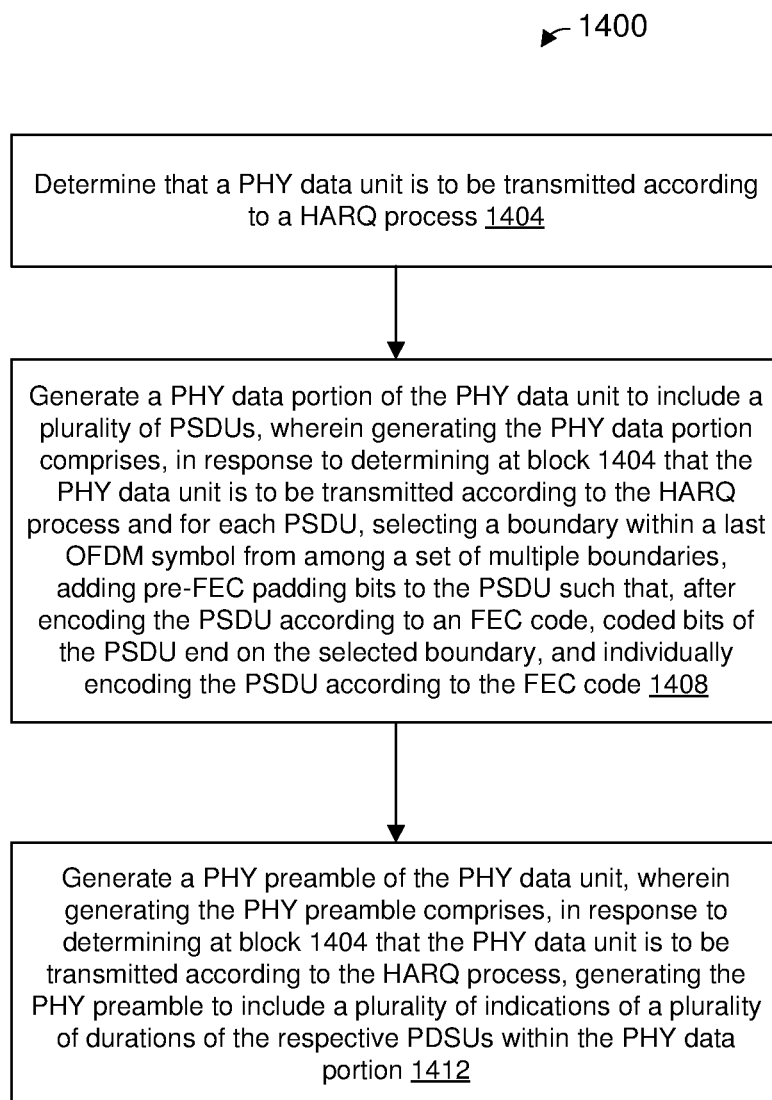
FIG. 14 is a flow diagram of another example method for generating a PHY data unit, according to another embodiment.

FIG. 14 is a flow diagram of an example method 1400 for generating a HARQ PPDU, according to an embodiment. The method 1400 involves generating a HARQ PPDU such as described above with reference to FIGS. 2, 3A-C, 4A-D, and 5-7, and/or in connection with any of the methods/processes described above with reference to FIGS. 8-13, according to various embodiments.

In some embodiments, the network interface 122/162 is configured to implement the method 1400. In some embodiments, the PHY processor 130/170 is configured to implement at least a portion of the method 1400. In an embodiment, the HARQ PPDU generator 142/192 is configured to implement at least a portion of the method 1400.

At block 1404, a communication device determines (e.g., the network interface 122/162 determines, the MAC processor 126/166 determines, the PHY processor 130/170 determines, etc.) that a PHY data unit is to be transmitted according to a HARQ process.

At block 1408, the communication device generates (e.g., the network interface 122/162 generates, the PHY processor 130/170 generates, the HARQ PPDU generator 142/192 generates, etc.), a PHY data portion of the PHY data unit. In an embodiment, generating the PHY data portion at block 1408 comprises, for each of a plurality of PSDUs to be included in the PHY data unit and in response to determining that the PHY data unit is to be transmitted according to the HARQ process: selecting a segment boundary within a last-occurring OFDM symbol from among a set of multiple segment boundaries, adding pre-FEC padding bits to the PSDU such that, after encoding the PSDU according to an FEC code, coded bits of the PSDU end on the selected segment boundary of the last-occurring OFDM symbol, and individually encoding the PSDU according to the FEC code.

At block 1412, the communication device generates (e.g., the network interface 122/162 generates, the PHY processor 130/170 generates, the HARQ PPDU generator 142/192 generates, the HARQ SIG field generator 144/194 generates etc.) a PHY preamble. In an embodiment, generating the PHY preamble at block 1412 comprises, in response to determining that the PHY data unit is to be transmitted according to the HARQ process, generating the PHY preamble to include a plurality of indications of a plurality of durations of the respective PSDUs within the PHY data portion.

In another embodiment, generating the PHY preamble at block 1412 further comprises, in response to determining at block 1404 that the PHY data unit is to be transmitted according to the HARQ process, including in the PHY preamble respective indications of the respective selected boundaries for the respective PSDUs.

In another embodiment, individually encoding the PSDU according to the FEC code at block 1408 comprises individually encoding the PSDU according to an LDPC code; and generating the PHY preamble at block 1412 further comprises, in response to determining at block 1404 that the PHY data unit is to be transmitted according to the HARQ process, including in the PHY preamble respective indicators of whether a respective extra OFDM symbol segment was included for a last-occurring OFDM symbol of the respective PSDU in connection with encoding of information in the respective PSDU according to the LDPC code.

In another embodiment, generating the PHY data portion comprises, for each of the plurality of PSDUs to be included in the PHY data unit and in response to determining at block 1404 that the PHY data unit is to be transmitted according to the HARQ process, after individually encoding the PSDU, adding post-FEC padding bits to the PSDU such that the PSDU ends on an OFDM symbol boundary.

In an embodiment, the PHY data unit is an SU PHY data unit to be transmitted to one other communication device. In another embodiment, the PHY data unit is an MU PHY data unit to be transmitted to a plurality of other communication devices.

In an embodiment, each PSDU comprises only a single MAC protocol data unit. In another embodiment, each PSDU comprises multiple MAC protocol data units.

Figure 15:
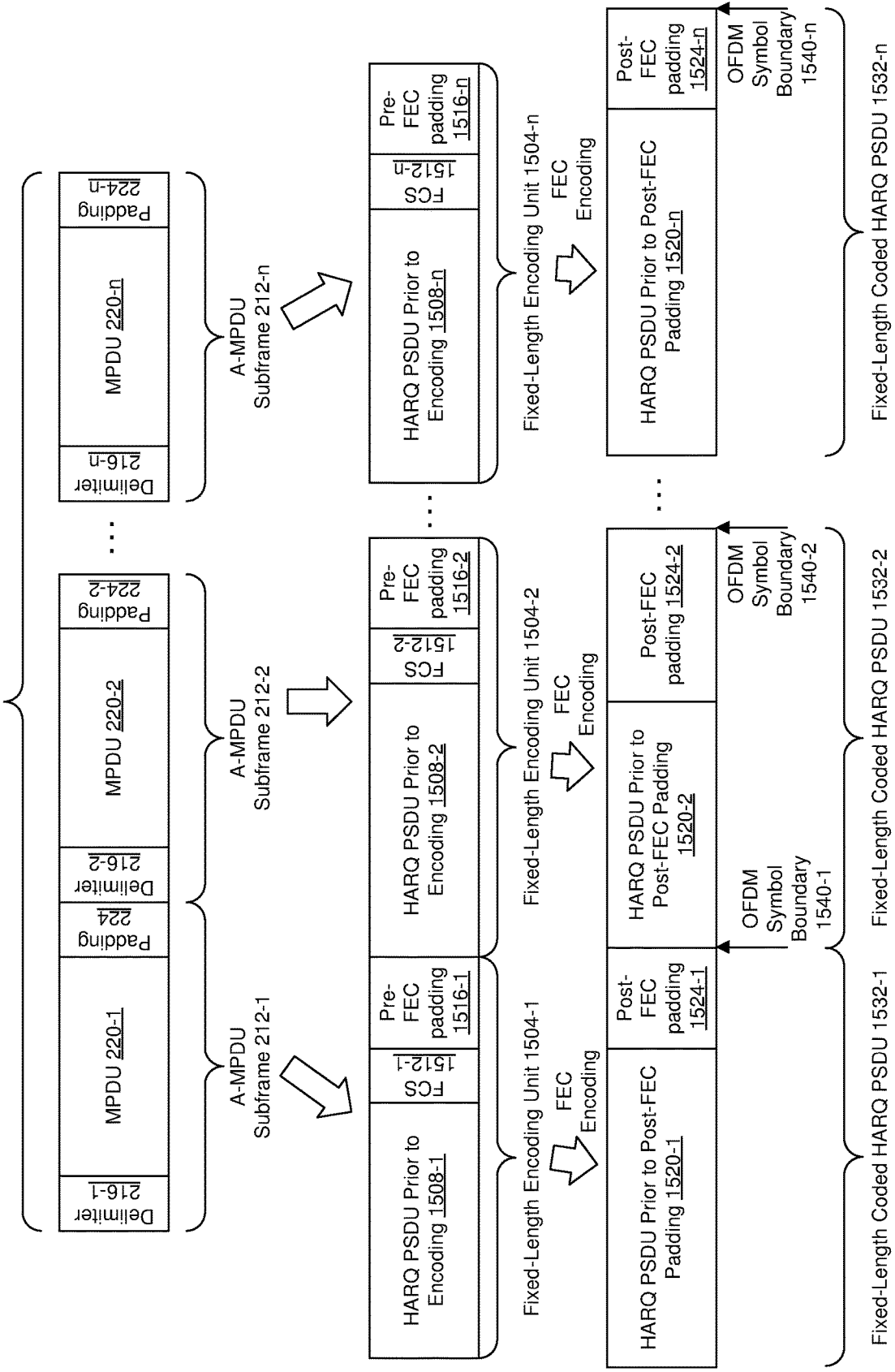
FIG. 15 is a diagram an example process for individually encoding fixed-length PSDUs to be included in a PHY data unit, according to another embodiment.

FIG. 15 is a diagram of another example process 1500 for individually encoding PSDUs to be included in a HARQ PPDU, according to an embodiment. The network interface 122/162 is configured to perform the process 1500, according to an embodiment. The PHY processor 126/166 is configured to perform the process 1500, according to an embodiment. The HARQ PPDU generator 142/192 is configured to perform the process 1500, according to an embodiment. In other embodiments, another suitable WLAN network interface performs the process 1500.

The process 1500 involves generating fixed length PSDUs. Because the PSDUs have a fixed length, a HARQ SIG field such as described above is not needed and can be omitted from a PHY preamble of a HARQ PPDU. The fixed length of the PSDUs is defined by a wireless communication protocol and known to wireless communication devices in a WLAN, according to an embodiment. The fixed length of the PSDUs is selected by the AP 114, which informs client stations in the WLAN 110 of the fixed length of the PSDUs, according to an embodiment. The fixed length of the PSDUs is negotiated by multiple wireless communication devices prior to the multiple wireless communication devices performing HARQ transmissions, according to an embodiment.

In various embodiments, the process 1500 is used with any of the HARQ PPDUs such as described above with reference to FIGS. 2, 3A-C, 4A-D, and 5-7 (except that HARQ PSDUs are fixed length, HARQ PPDUs do not include a HARQ SIG field, the first SIG field does not include an indicator that HARQ PPDU includes a HARQ SIG field, and the first SIG field does not include information fields related to the HARQ SIG field, such as a HARQ SIG field duration and an MCS of the HARQ SIG field), or another suitable HARQ PPDU. In various embodiments, the process 1500 is used with any of the methods/processes describe with reference to FIGS. 8-11 (except that HARQ PSDUs are fixed length, HARQ PPDUs do not include a HARQ SIG field, and the first SIG field does not include an indicator that HARQ PPDU includes a HARQ SIG field), or any other suitable method.

The process 1500 is similar to the process 1200, and elements with the same reference numbers are not described in detail for purposes of brevity.

A plurality of fixed-length PSDU encoding units 1504 are generated (e.g., the PHY processor 130/170 generates the fixed-length PSDU encoding units 1504, the HARQ PPDU generator 142/192 generates the fixed-length PSDU encoding units 1504, etc.). Although each fixed-length PSDU encoding unit 1504 is illustrated in FIG. 15 as corresponding to one A-MPDU subframe 212, more generally each fixed-length PSDU encoding unit 1504 includes one or more A-MPDU subframes 212. For example, the network interface 122/162 selects (e.g., the PHY processor 130/170 selects, the HARQ PPDU generator 142/192 selects, etc.) a quantity of A-MPDU subframes 212 such that all of the selected A-MPDU subframes 212 fit within a fixed-length PSDU encoding unit 1504, according to an embodiment.

Each fixed-length PSDU encoding unit 1504 includes HARQ PSDU information bits 1508, an error detection field (e.g., a frame check sequence (FCS) field) 1512, and pre-FEC padding bits 1516. A value of the FCS field 1512 is generated by applying an error detection code (e.g., a CRC code) to the HARQ PSDU information bits 1508. The pre-FEC padding bits 1516 are added to each PSDU prior to FEC encoding. In an embodiment, an amount of the pre-FEC padding bits 1516 is selected so that the PSDU encoding unit 1504 has the fixed-length. In an embodiment, the fixed length of the PSDU encoding unit 1504 is selected so that, after the fixed-length PSDU encoding unit 1504 is FEC encoded, an encoded PSDU 1520 will end at a selected corresponding pre-FEC padding segment boundary within a last-occurring OFDM symbol for the PSDU. In an embodiment, the same pre-FEC padding segment boundary is selected for all of the fixed length PSDUs.

In another embodiment, for each PSDU a corresponding pre-FEC padding segment boundary within a last-occurring OFDM symbol for the PSDU is selected, and an amount of pre-FEC padding bits 1516 is determined so that, after the fixed-length PSDU encoding unit 1504 is FEC encoded, an encoded PSDU 1520 will end at the corresponding pre-FEC padding segment boundary. In an embodiment, the same pre-FEC padding segment boundary is selected for all of the fixed length PSDUs.

In various embodiments, FEC encoding comprises BCC encoding, LDPC encoding, or some other suitable FEC encoding.

Post-FEC padding 1524 is added to each encoded PSDU 1520 so that each fixed-length coded HARQ PSDU 1532 has a fixed-length. In an embodiment, the post-FEC padding 1524 is added to each encoded PSDU 1520 so that each fixed-length coded HARQ PSDU 1532 ends at an OFDM symbol boundary 1540.

In the process 1500 described above, a HARQ SIG field is not required. For example, a receiver can determine a duration of each coded HARQ PSDU 1532 based on, for example, an MCS of the PHY data portion and a length/duration of the PHY data portion (where the MCS of the PHY data portion and a length/duration of the PHY data portion are indicated in the PHY preamble).

A SIG field in the PHY preamble is generated to indicate whether PPDU includes HARQ PSDUs. For example, a bit in the SIG field indicates whether PPDU includes HARQ PSDUs, according to an embodiment. If the PPDU is a trigger-based PPDU, a trigger frame includes information that indicates whether the trigger-based PPDU sent in response to the trigger frame should include HARQ PSDUs.

Figure 16:
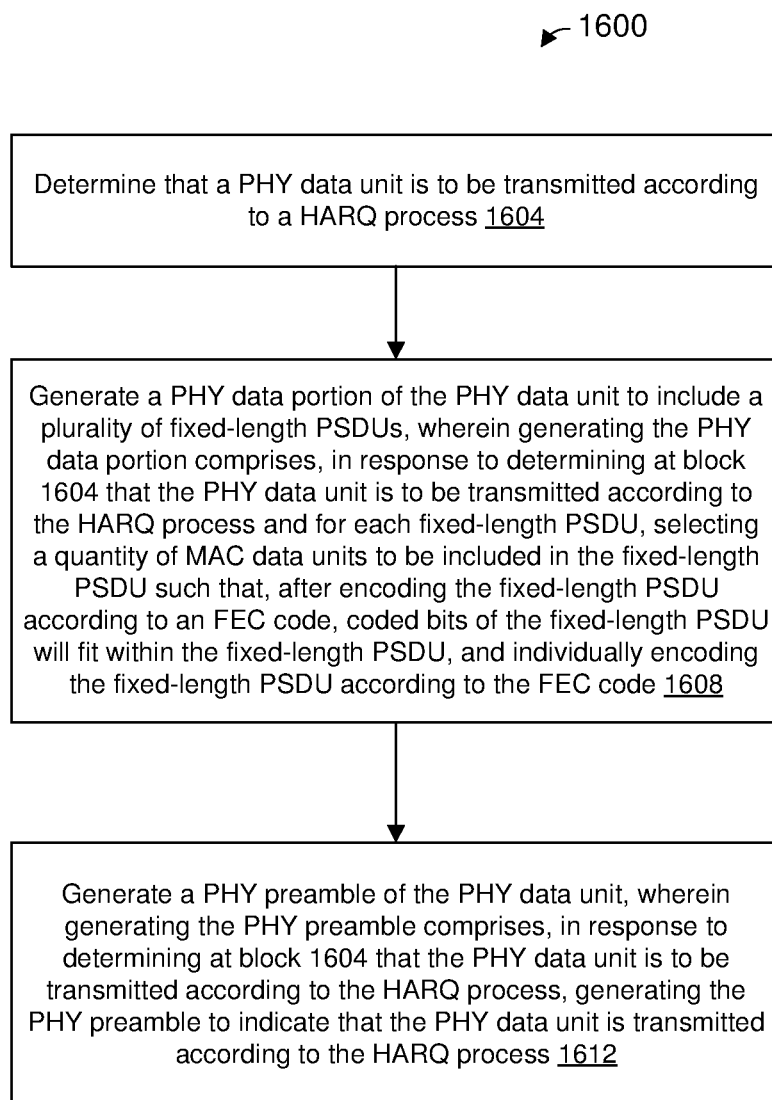
FIG. 16 is a flow diagram of an example method for generating a PHY data unit that includes fixed-length PSDUs, according to another embodiment.

FIG. 16 is a flow diagram of an example method 1600 for generating a HARQ PPDU, according to an embodiment. The method 1600 involves generating a HARQ PPDU such as described above with reference to FIGS. 2, 3A-C, 4A-D, and 5-7 (except that HARQ PSDUs are fixed length, HARQ PPDUs do not include a HARQ SIG field, the first SIG field does not include an indicator that HARQ PPDU includes a HARQ SIG field, and the first SIG field does not include information fields related to the HARQ SIG field, such as a HARQ SIG field duration and an MCS of the HARQ SIG field), and/or in connection with any of the methods/processes described above with reference to FIGS. 8-14 (except that HARQ PSDUs are fixed length, HARQ PPDUs do not include a HARQ SIG field, the first SIG field does not include an indicator that HARQ PPDU includes a HARQ SIG field, and the first SIG field does not include information fields related to the HARQ SIG field, such as a HARQ SIG field duration and an MCS of the HARQ SIG field), according to various embodiments. In an embodiment, the method 1600 involves generating a HARQ PPDU in connection with the process illustrated in FIG. 15.

The method 1600 involves generating fixed length PSDUs. Because the PSDUs have a fixed length, a HARQ SIG field such as described above is not needed and can be omitted from a PHY preamble of a HARQ PPDU. The fixed length of the PSDUs is defined by a wireless communication protocol and known to wireless communication devices in a WLAN, according to an embodiment. The fixed length of the PSDUs is selected by the AP 114, which informs client stations in the WLAN 110 of the fixed length of the PSDUs, according to an embodiment. The fixed length of the PSDUs is negotiated by multiple wireless communication devices prior to the multiple wireless communication devices performing HARQ transmissions, according to an embodiment.

At block 1604, a communication device determines (e.g., the network interface 122/162 determines, the MAC processor 126/166 determines, the PHY processor 130/170 determines, etc.) that a PHY data unit is to be transmitted according to a HARQ process.

At block 1608, the communication device generates (e.g., the network interface 122/162 generates, the PHY processor 130/170 generates, the HARQ PPDU generator 142/192 generates, etc.), a PHY data portion of the PHY data unit. In an embodiment, generating the PHY data portion at block 1608 comprises, for each of a plurality of fixed-length PSDUs to be included in the PHY data unit and in response to determining that the PHY data unit is to be transmitted according to the HARQ process: selecting a quantity of MAC data units to be included in the fixed-length PSDU such that, after encoding the fixed-length PSDU according to an FEC code, coded bits of the fixed-length PSDU will fit within the fixed-length PSDU, and individually encoding the fixed-length PSDU according to the FEC code.

In an embodiment, generating the PHY data portion at block 1608 comprises selecting the quantity of MAC data units to be included in the fixed-length PSDU such that, prior to encoding the fixed-length PSDU according to the FEC code, uncoded bits of the fixed-length PSDU will fit within a fixed-length encoding unit. In an embodiment, generating the PHY data portion at block 1608 comprises including in the fixed-length encoding unit error detection information.

In an embodiment, generating the PHY data portion at block 1608 comprises adding padding bits to each of a plurality of PSDU encoding units prior to FEC encoding. In an embodiment, generating the PHY data portion at block 1608 comprises adding padding bits to each fixed-length PSDU after FEC encoding.

At block 1612, the communication device generates (e.g., the network interface 122/162 generates, the PHY processor 130/170 generates, the HARQ PPDU generator 142/192 generates, the HARQ SIG field generator 144/194 generates etc.) a PHY preamble. In an embodiment, generating the PHY preamble at block 1612 comprises, in response to determining that the PHY data unit is to be transmitted according to the HARQ process, generating the PHY preamble to include an indication that the PHY data unit is transmitted according to the HARQ process.

In an embodiment, the PHY data unit is an SU PHY data unit to be transmitted to one other communication device. In another embodiment, the PHY data unit is an MU PHY data unit to be transmitted to a plurality of other communication devices.

Embodiment 1

A method for generating a physical layer (PHY) data unit for transmission in a wireless local area network (WLAN), the method comprising: determining, at a communication device, that the PHY data unit is to be transmitted according to a hybrid automatic repeat request (HARQ) process; generating, at a communication device, a PHY data portion of the PHY data unit, wherein generating the PHY data portion comprises: generating one or more PHY protocol service data units (PSDUs), and in response to determining that the PHY data unit is to be transmitted according to the HARQ process, individually encoding PSDUs of the one or more PSDUs. The method also comprises: generating, at a communication device, a PHY preamble, wherein generating the PHY preamble comprises: generating a first signal field in the PHY preamble, and in response to determining that the PHY data unit is to be transmitted according to the HARQ process: including in the first signal field an indicator to indicate that the PHY preamble includes a second signal field with HARQ information regarding the PHY data unit, and generating the second signal field to include one or more indications of one or more durations of the one or more respective PSDUs within the PHY data portion, wherein the second signal field is separate from the first signal field.

Embodiment 2

The method of embodiment 1, wherein generating the second signal field comprises: generating a respective PSDU information subfield for each of the one or more PSDUs, wherein each PSDU information subfield includes a respective indication of a respective duration of the respective PSDU.

Embodiment 3

The method of embodiment 2, wherein generating the respective PSDU information subfield for each of the one or more PSDUs comprises: including in the respective PSDU information subfield padding information corresponding to the respective PSDU.

Embodiment 4

The method of either of embodiments 2 or 3, wherein generating the respective PSDU information subfield for each of the one or more PSDUs further comprises: including in the respective PSDU information subfield an indicator of whether an extra OFDM symbol segment was included for the respective PSDU in connection with low density parity check (LDPC) encoding of information in the respective PSDU.

Embodiment 5

The method of any of embodiments 1-4, wherein: the PHY data unit is a multi-user (MU) PHY data unit to be transmitted to a plurality of other communication devices; generating the PHY preamble further comprises generating a third signal field that includes allocation information that allocates multiple frequency resource units (RUs) among the multiple other communication devices; and generating the second signal field comprises generating a respective HARQ user information subfield for one or more respective other communication devices, wherein each HARQ user information subfield includes a PSDU information subfield for each of one or more PSDUs for the respective other communication device, wherein each PSDU information subfield includes a respective indication of a respective duration of the respective PSDU.

Embodiment 6

The method of embodiment 5, wherein each HARQ user information subfield is generated to include a station identifier of the respective other communication device.

Embodiment 7

The method of either of embodiments 5 or 6, wherein: the second signal field is generated to be transmitted within a first frequency subchannel; the second signal field includes HARQ information only for PSDUs to be transmitted in one or more RUs that overlap with the first frequency subchannel; and generating the PHY preamble further comprises generating one or more other second signal fields corresponding to one or more respective second frequency subchannels, wherein each of the one or more other second signal fields are generated to include HARQ information only for PSDUs to be transmitted within one or more respective RUs that overlap with the respective second frequency subchannel.

Embodiment 8

The method of any of embodiments 1-7, wherein each PSDU comprises only a single media access control (MAC) protocol data unit.

Embodiment 9

The method of any of embodiments 1-7, wherein each PSDU comprises multiple media access control (MAC) protocol data units.

Embodiment 10

A wireless communication device, comprising: a network interface device associated with a first communication device, wherein the network interface device is implemented on one or more integrated circuit (IC) devices, and wherein the one or more IC devices are configured to: determine that a PHY data unit is to be transmitted according to a hybrid automatic repeat request (HARQ) process, and generate a PHY data portion of the PHY data unit, comprising: generating one or more PHY protocol service data units (PSDUs), and in response to determining that the PHY data unit is to be transmitted according to the HARQ process, individually encoding PSDUs of the one or more PSDUs. The one or more IC devices are further configured to: generate a PHY preamble, comprising: generating a first signal field in the PHY preamble, and in response to determining that the PHY data unit is to be transmitted according to the HARQ process: including in the first signal field an indicator to indicate that the PHY preamble includes a second signal field with HARQ information regarding the PHY data unit, and generating the second signal field to include one or more indications of one or more durations of the one or more respective PSDUs within the PHY data portion, wherein the second signal field is separate from the first signal field.

Embodiment 11

The wireless communication device of embodiment 10, wherein the one or more IC devices are further configured to: generate a respective PSDU information subfield for each of the one or more PSDUs, wherein each PSDU information subfield is generated to include a respective indication of a respective duration of the respective PSDU.

Embodiment 12

The wireless communication device of embodiment 11, wherein the one or more IC devices are further configured to: include in the respective PSDU information subfield padding information corresponding to the respective PSDU.

Embodiment 13

The wireless communication device of either of embodiments 11 or 12, wherein the one or more IC devices are further configured to: include in the respective PSDU information subfield an indicator of whether an extra OFDM symbol segment was included for the respective PSDU in connection with low density parity check (LDPC) encoding of information in the respective PSDU.

Embodiment 14

The wireless communication device of any of embodiments 10-13, wherein: the PHY data unit is a multi-user (MU) PHY data unit to be transmitted to a plurality of other communication devices; and the one or more IC devices are further configured to: generate the PHY preamble to include a third signal field that includes allocation information that allocates multiple frequency resource units (RUs) among the multiple other communication devices, and generate the second signal field to include a respective HARQ user information subfield for one or more respective other communication devices, wherein each HARQ user information subfield includes a PSDU information subfield for each of one or more PSDUs for the respective other communication device, wherein each PSDU information subfield includes a respective indication of a respective duration of the respective PSDU.

Embodiment 15

The wireless communication device of embodiment 14, wherein each HARQ user information subfield is generated to include a station identifier of the respective other communication device.

Embodiment 16

The wireless communication device of either of embodiments 14 or 15, wherein: the second signal field is generated to be transmitted within only a first frequency subchannel; the second signal field includes HARQ information only for PSDUs to be transmitted in one or more RUs that overlap with the first frequency subchannel; the one or more IC devices are further configured to generate the PHY preamble to further include one or more other second signal fields corresponding to one or more respective second frequency subchannels, wherein each of the one or more other second signal fields are generated to include HARQ information only for PSDUs to be transmitted within one or more respective RUs that overlap with the respective second frequency subchannel.

Embodiment 17

The wireless communication device of any of embodiments 10-16, wherein each PSDU comprises only a single media access control (MAC) protocol data unit.

Embodiment 18

The wireless communication device of any of embodiments 10-16, wherein each PSDU comprises multiple media access control (MAC) protocol data units.

Embodiment 19

A method for processing a physical layer (PHY) data unit in a wireless local area network (WLAN), the method comprising: receiving, at a communication device, the PHY data unit via a wireless communication channel; analyzing, at the communication device, a first signal field in a PHY preamble of the PHY data unit to determine that the PHY preamble includes a second signal field with hybrid automatic repeat request (HARQ) information regarding the PHY data unit; in response to determining that the PHY preamble includes the second signal field, analyzing, at the communication device, the second signal field to determine one or more durations of one or more respective PHY protocol service data units (PSDUs) within a PHY data portion of the PHY data unit; and using, at the communication device, the one or more durations of the one or more respective PSDUs to decode information included in at least one of the one or more PSDUs according to a HARQ process.

Embodiment 20

The method of embodiment 19, wherein the second signal field includes one or more subfields that indicate one or more respective numbers of orthogonal frequency division multiplexing (OFDM) symbols in the respective one or more PSDUs.

Embodiment 21

The method of either of embodiments 19 or 20, wherein: the PHY data unit is a multi-user (MU) PHY data unit transmitted to the communication device and one or more other communication devices; the one or more PSDUs are for the communication device; the MU PHY data unit includes one or more other PSDUs for the one or more other communication devices; the method further comprises analyzing, at the communication device, a third signal field in the PHY preamble of the PHY data unit to determine a frequency resource unit allocated to the communication device for the MU PHY data unit; the second signal field includes a HARQ user information field that comprises i) a station identifier subfield and ii) one or more PSDU information fields corresponding to the one or more PSDUs for the communication device; the method further comprises: analyzing, at the communication device, the station identifier subfield in the HARQ user information field to determine that the HARQ user information field corresponds to the communication device, and in response to determining that the HARQ user information field corresponds to the communication device, analyzing the one or more PSDU information fields in the HARQ user information field to determine that the one or more durations of the one or more respective PSDUs for the communication device.

Embodiment 22

A wireless communication device, comprising: a network interface device associated with a first communication device, wherein the network interface device is implemented on one or more integrated circuit (IC) devices, and wherein the one or more IC devices are configured to: receive a physical layer (PHY) data unit via a wireless communication channel of a wireless local area network, analyze a first signal field in a PHY preamble of the PHY data unit to determine that the PHY preamble includes a second signal field with hybrid automatic repeat request (HARQ) information regarding the PHY data unit, in response to determining that the PHY preamble includes the second signal field, analyze the second signal field to determine one or more durations of one or more respective PHY protocol service data units (PSDUs) within a PHY data portion of the PHY data unit, and use the one or more durations of the one or more respective PSDUs to decode information included in at least one of the one or more PSDUs according to a HARQ process.

Embodiment 23

The wireless communication device of embodiment 22, wherein the second signal field includes one or more subfields that indicate one or more respective numbers of orthogonal frequency division multiplexing (OFDM) symbols in the respective one or more PSDUs.

Embodiment 24

The wireless communication device of either of embodiments 22 or 23, wherein: the PHY data unit is a multi-user (MU) PHY data unit transmitted to the communication device and one or more other communication devices; the one or more PSDUs are for the communication device; the MU PHY data unit includes one or more other PSDUs for the one or more other communication devices; the one or more IC devices are further configured to analyze a third signal field in the PHY preamble of the PHY data unit to determine a frequency resource unit allocated to the communication device for the MU PHY data unit; the second signal field includes a HARQ user information field that comprises i) a station identifier subfield and ii) one or more PSDU information fields corresponding to the one or more PSDUs for the communication device; the one or more IC devices are further configured to: analyze the station identifier subfield in the HARQ user information field to determine that the HARQ user information field corresponds to the communication device, and in response to determining that the HARQ user information field corresponds to the communication device, analyze the one or more PSDU information fields in the HARQ user information field to determine that the one or more durations of the one or more respective PSDUs for the communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a computer readable memory such as a random access memory (RAM), a read only memory (ROM), a flash memory, etc. The software or firmware instructions include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission in a wireless local area network (WLAN), the method comprising:
   determining, at a communication device, that the PHY data unit is to be transmitted according to a hybrid automatic repeat request (HARQ) process;
   generating, at a communication device, a PHY data portion of the PHY data unit, wherein
   generating the PHY data portion comprises:
      generating one or more PHY protocol service data units (PSDUs), and
      in response to determining that the PHY data unit is to be transmitted according to the HARQ process, individually encoding PSDUs of the one or more PSDUs;
   generating, at a communication device, a PHY preamble, wherein generating the PHY preamble comprises:
      generating a first signal field in the PHY preamble, and
      in response to determining that the PHY data unit is to be transmitted according to the HARQ process:
         including in the first signal field an indicator to indicate that the PHY preamble includes a second signal field with HARQ information regarding the PHY data unit wherein the indicator is also configurable to indicate that the PHY preamble does not include the second signal field, and
         generating the second signal field to include one or more indications of one or more durations of the one or more respective PSDUs within the PHY data portion, wherein the second signal field is separate from the first signal field.

2. The method of claim 1, wherein generating the second signal field comprises:
   generating a respective PSDU information subfield for each of the one or more PSDUs, wherein each PSDU information subfield includes a respective indication of a respective duration of the respective PSDU.

3. The method of claim 2, wherein generating the respective PSDU information subfield for each of the one or more PSDUs comprises:
   including in the respective PSDU information subfield padding information which comprises a pre-forward error correction (FEC) padding factor corresponding to the respective PSDU.

4. The method of claim 2, wherein generating the respective PSDU information subfield for each of the one or more PSDUs further comprises:
   including in the respective PSDU information subfield a bit indicator of whether an extra OFDM symbol segment was included for the respective PSDU in connection with low density parity check (LDPC) encoding of information in the respective PSDU.

5. The method of claim 1, wherein:
   the PHY data unit is a multi-user (MU) PHY data unit to be transmitted to a plurality of other communication devices;
   generating the PHY preamble further comprises generating a third signal field that includes allocation information that allocates multiple frequency resource units (RUs) among the multiple other communication devices; and
   generating the second signal field comprises generating a respective HARQ user information subfield for one or more respective other communication devices, wherein each HARQ user information subfield includes a PSDU information subfield for each of one or more PSDUs for the respective other communication device, wherein each PSDU information subfield includes a respective indication of a respective duration of the respective PSDU.

6. The method of claim 5, wherein each HARQ user information subfield is generated to include a station identifier of the respective other communication device.

7. The method of claim 5, wherein:
   the second signal field is generated to be transmitted within a first frequency subchannel;
   the second signal field includes HARQ information only for PSDUs to be transmitted in one or more RUs that overlap with the first frequency subchannel;
   generating the PHY preamble further comprises generating one or more other second signal fields corresponding to one or more respective second frequency subchannels, wherein each of the one or more other second signal fields are generated to include HARQ information only for PSDUs to be transmitted within one or more respective RUs that overlap with the respective second frequency subchannel.

8. The method of claim 1, wherein each PSDU comprises only a single media access control (MAC) protocol data unit.

9. The method of claim 1, wherein each PSDU comprises multiple media access control (MAC) protocol data units.

10. A wireless communication device, comprising:
a network interface device associated with a first communication device, wherein the network interface device is implemented on one or more integrated circuit (IC) devices, and wherein the one or more IC devices are configured to:
determine that a PHY data unit is to be transmitted according to a hybrid automatic repeat request (HARQ) process, and
generate a PHY data portion of the PHY data unit, comprising:
generating one or more PHY protocol service data units (PSDUs), and
in response to determining that the PHY data unit is to be transmitted according to the HARQ process, individually encoding PSDUs of the one or more PSDUs;
wherein the one or more IC devices are further configured to:
generate a PHY preamble, comprising:
generating a first signal field in the PHY preamble, and
in response to determining that the PHY data unit is to be transmitted according to the HARQ process:
including in the first signal field an indicator to indicate that the PHY preamble includes a second signal field with HARQ information regarding the PHY data unit wherein the indicator is also configurable to indicate that the PHY preamble does not include the second signal field, and
generating the second signal field to include one or more indications of one or more durations of the one or more respective PSDUs within the PHY data portion, wherein the second signal field is separate from the first signal field.

11. The wireless communication device of claim 10, wherein the one or more IC devices are further configured to:
generate a respective PSDU information subfield for each of the one or more PSDUs, wherein each PSDU information subfield is generated to include a respective indication of a respective duration of the respective PSDU.

12. The wireless communication device of claim 11, wherein the one or more IC devices are further configured to:
include in the respective PSDU information subfield padding information corresponding to the respective PSDU which comprises a pre-forward error correction (FEC) padding factor.

13. The wireless communication device of claim 11, wherein the one or more IC devices are further configured to:
include in the respective PSDU information subfield a bit indicator of whether an extra OFDM symbol segment was included for the respective PSDU in connection with low density parity check (LDPC) encoding of information in the respective PSDU.

14. The wireless communication device of claim 10, wherein:
the PHY data unit is a multi-user (MU) PHY data unit to be transmitted to a plurality of other communication devices; and
the one or more IC devices are further configured to:
generate the PHY preamble to include a third signal field that includes allocation information that allocates multiple frequency resource units (RUs) among the multiple other communication devices, and
generate the second signal field to include a respective HARQ user information subfield for one or more respective other communication devices, wherein each HARQ user information subfield includes a PSDU information subfield for each of one or more PSDUs for the respective other communication device, wherein each PSDU information subfield includes a respective indication of a respective duration of the respective PSDU.

15. The wireless communication device of claim 14, wherein each HARQ user information subfield is generated to include a station identifier of the respective other communication device.

16. The wireless communication device of claim 14, wherein:
the second signal field is generated to be transmitted within only a first frequency subchannel;
the second signal field includes HARQ information only for PSDUs to be transmitted in one or more RUs that overlap with the first frequency subchannel;
the one or more IC devices are further configured to generate the PHY preamble to further include one or more other second signal fields corresponding to one or more respective second frequency subchannels, wherein each of the one or more other second signal fields are generated to include HARQ information only for PSDUs to be transmitted within one or more respective RUs that overlap with the respective second frequency subchannel.

17. The wireless communication device of claim 10, wherein each PSDU comprises only a single media access control (MAC) protocol data unit.

18. The wireless communication device of claim 10, wherein each PSDU comprises multiple media access control (MAC) protocol data units.

19. A method for processing a physical layer (PHY) data unit in a wireless local area network (WLAN), the method comprising:
receiving, at a communication device, the PHY data unit via a wireless communication channel;
analyzing, at the communication device, a first signal field in a PHY preamble of the PHY data unit to determine that the PHY preamble includes a second signal field with hybrid automatic repeat request (HARQ) information regarding the PHY data unit wherein an indicator in the first signal field indicates whether the PHY preamble includes the second signal field;
in response to determining that the PHY preamble includes the second signal field, analyzing, at the communication device, the second signal field to determine one or more durations of one or more respective PHY protocol service data units (PSDUs) within a PHY data portion of the PHY data unit; and
using, at the communication device, the one or more durations of the one or more respective PSDUs to decode information included in at least one of the one or more PSDUs according to a HARQ process.

20. The method of claim 19, wherein the second signal field includes one or more subfields that indicate one or more respective numbers of orthogonal frequency division multiplexing (OFDM) symbols in the respective one or more PSDUs.

21. The method of claim 19, wherein:
the PHY data unit is a multi-user (MU) PHY data unit transmitted to the communication device and one or more other communication devices;
the one or more PSDUs are for the communication device;
the MU PHY data unit includes one or more other PSDUs for the one or more other communication devices;
the method further comprises analyzing, at the communication device, a third signal field in the PHY preamble of the PHY data unit to determine a frequency resource unit allocated to the communication device for the MU PHY data unit;
the second signal field includes a HARQ user information field that comprises i) a station identifier subfield and ii) one or more PSDU information fields corresponding to the one or more PSDUs for the communication device;
the method further comprises:
analyzing, at the communication device, the station identifier subfield in the HARQ user information field to determine that the HARQ user information field corresponds to the communication device, and
in response to determining that the HARQ user information field corresponds to the communication device, analyzing the one or more PSDU information fields in the HARQ user information field to determine that the one or more durations of the one or more respective PSDUs for the communication device.

22. A wireless communication device, comprising:
a network interface device associated with a first communication device, wherein the network interface device is implemented on one or more integrated circuit (IC) devices, and wherein the one or more IC devices are configured to:
receive a physical layer (PHY) data unit via a wireless communication channel of a wireless local area network,
analyze a first signal field in a PHY preamble of the PHY data unit to determine that the PHY preamble includes a second signal field with hybrid automatic repeat request (HARQ) information regarding the PHY data unit, wherein an indicator in the first signal field indicates whether the PHY preamble includes the second signal field,
in response to determining that the PHY preamble includes the second signal field, analyze the second signal field to determine one or more durations of one or more respective PHY protocol service data units (PSDUs) within a PHY data portion of the PHY data unit, and
use the one or more durations of the one or more respective PSDUs to decode information included in at least one of the one or more PSDUs according to a HARQ process.

23. The wireless communication device of claim 22, wherein the second signal field includes one or more subfields that indicate one or more respective numbers of orthogonal frequency division multiplexing (OFDM) symbols in the respective one or more PSDUs.

24. The wireless communication device of claim 22, wherein:
the PHY data unit is a multi-user (MU) PHY data unit transmitted to the communication device and one or more other communication devices;
the one or more PSDUs are for the communication device;
the MU PHY data unit includes one or more other PSDUs for the one or more other communication devices;
the one or more IC devices are further configured to analyze a third signal field in the PHY preamble of the PHY data unit to determine a frequency resource unit allocated to the communication device for the MU PHY data unit;
the second signal field includes a HARQ user information field that comprises i) a station identifier subfield and ii) one or more PSDU information fields corresponding to the one or more PSDUs for the communication device;
the one or more IC devices are further configured to:
analyze the station identifier subfield in the HARQ user information field to determine that the HARQ user information field corresponds to the communication device, and
in response to determining that the HARQ user information field corresponds to the communication device, analyze the one or more PSDU information fields in the HARQ user information field to determine that the one or more durations of the one or more respective PSDUs for the communication device.

* * * * *